(12) United States Patent
Williams et al.

(10) Patent No.: US 12,348,421 B2
(45) Date of Patent: **\*Jul. 1, 2025**

(54) LOCAL CONGESTION MITIGATION

(71) Applicant: Cisco Technology, Inc., San Jose, CA (US)

(72) Inventors: Ralph Maxwell Williams, Leesburg, VA (US); Eleni Palkopoulou, Dallas, TX (US)

(73) Assignee: CISCO TECHNOLOGY, INC., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/489,350

(22) Filed: Oct. 18, 2023

(65) Prior Publication Data
US 2024/0048490 A1    Feb. 8, 2024

Related U.S. Application Data

(63) Continuation of application No. 17/387,225, filed on Jul. 28, 2021, now Pat. No. 11,838,210.

(60) Provisional application No. 63/168,666, filed on Mar. 31, 2021.

(51) Int. Cl.
*H04L 47/122* (2022.01)
*H04L 45/00* (2022.01)
*H04L 47/11* (2022.01)

(52) U.S. Cl.
CPC ............ *H04L 47/122* (2013.01); *H04L 45/22* (2013.01); *H04L 47/11* (2013.01)

(58) Field of Classification Search
CPC ......... H04L 45/22; H04L 47/11; H04L 47/122
See application file for complete search history.

(56) References Cited

U.S. PATENT DOCUMENTS

| | | | |
|---|---|---|---|
| 1,004,158 | A | 9/1911 | Fowler |
| 8,897,140 | B1 \* | 11/2014 | Bhattacharya ........ H04L 47/122 370/237 |
| 9,473,408 | B1 | 10/2016 | Kabbani et al. |
| 10,374,956 | B1 \* | 8/2019 | Tracy .................. H04L 41/0816 |
| 11,171,883 | B1 | 11/2021 | Ma |
| 11,356,361 | B2 | 6/2022 | Filsfils et al. |
| 11,451,478 | B1 | 9/2022 | Torvi et al. |
| 11,838,210 | B2 \* | 12/2023 | Williams .............. H04L 47/122 |
| 2010/0091656 | A1 | 4/2010 | Chiu et al. |

(Continued)

OTHER PUBLICATIONS

Cisco, "Bandwidth Optimization (BWOpt)", Cisco Crosswork Optimization Engine 1.2.1 Function Packs, Updated Jul. 6, 2020, 8 pages.

(Continued)

*Primary Examiner* — Donald L Mills
(74) *Attorney, Agent, or Firm* — Edell, Shapiro & Finnan, LLC

(57) ABSTRACT

Local Congestion Mitigation re-routes traffic around a congested network segment without regard for end point destinations of the re-routed traffic. By inhibiting consideration of end point destinations, determinations of alternate routes are simplified relative to techniques that compute new end-to-end routes for traffic when a congested segment is encountered. These methods therefore remain relatively efficient as a network grows in size and network routes within the network become increasingly complex.

20 Claims, 17 Drawing Sheets

(56) References Cited

U.S. PATENT DOCUMENTS

| | | | |
|---|---|---|---|
| 2013/0275567 A1 | 10/2013 | Karthikeyan et al. | |
| 2016/0294702 A1 | 10/2016 | Kodialam et al. | |
| 2018/0183720 A1 | 6/2018 | Shpiner et al. | |
| 2019/0158406 A1 | 5/2019 | LaBerge et al. | |
| 2019/0280964 A1 | 9/2019 | Michael et al. | |
| 2020/0366613 A1 | 11/2020 | Skalecki et al. | |
| 2021/0014146 A1 | 1/2021 | Chen et al. | |
| 2021/0281514 A1* | 9/2021 | Guo | H04L 41/0896 |
| 2022/0217202 A1* | 7/2022 | Kempanna | H04L 41/0897 |
| 2022/0368625 A1* | 11/2022 | Smith | H04L 45/24 |

OTHER PUBLICATIONS

Hui Ding et al., "PCE-based Virtual Network Topologies Reconfiguration and Congestion Avoidance Routing Scheme for Optical Networks," IEEE Xplore, 2011 International Conference on Information Photonics and Optical Communications, 2011, 4 pages.

Clarence Filsfils et al., "Segment Routing Topology Independent LFA (TI-LFA)", Cisco, Sep. 27, 2016, 101 pages.

Hasanein Hasan et al., "Improvement of Performance of EIGRP Network by Using a Supervisory Controller with Smart Congestion Avoidance Algorithm", 2016 International Conference on Telecommunications and Multimedia (TEMU), IEEE, Jul. 2016, 8 pages.

Yuuki Udagawa et al., "Propose of the Dynamic Routing Methods using Available Bandwidth and Degree for Congestion Avoidance", IEICE—The 18th Asia-Pacific Network Operations and Management Symposium (APNOMS) 2016, IEEE, Oct. 2016, 4 pages.

* cited by examiner

LOCAL CONGESTION MITIGATION

CROSS REFERENCE TO RELATED APPLICATIONS

This application is a continuation of U.S. application Ser. No. 17/387,225, filed Jul. 28, 2021, now U.S. Pat. No. 11,838,210, which claims priority to U.S. Provisional Application No. 63/168,666, filed Mar. 31, 2021, the entirety of each of which is incorporated herein by reference.

TECHNICAL FIELD

The present disclosure relates to networking techniques.

BACKGROUND

Networks can be designed to be resilient to certain failures with proper offline capacity planning and failure analysis to ensure sufficient capacity exists to continue to support the services they provide to their customers and meet Service Level Agreements (SLAs). Capacity planning cycles are typically on a longer timescale due to the lead times required to provision new capacity in networks, which can be approximately weeks to months. Traffic growth forecasting as part of a capacity planning process attempts to predict how traffic patterns will shift over time and grow as new services and customers are expected to come online. This process, being predictive in nature, is always subject to a certain amount of error that can lead to insufficient capacity in parts of the network as actual traffic loads exceed predicted and planned loads. As interface utilization exceeds planned levels, the risk of service interruptions affecting SLAs rises. To combat this possibility, network operators may choose to massively over-provision their network, which leads to higher costs to provide services to their customers.

Tactical traffic engineering (TTE) can be employed to temporarily account for traffic surges or changes in traffic loading that exceed what was planned. This approach attempts to compute alternate paths for some traffic on congested links to parts of the network that have sufficient capacity. This has the potential to allow network operators to reduce over-provisioning to account for all possible failures (e.g., multiple simultaneous failures) and errors in traffic growth forecasting by instead attempting to shift some traffic to where the available capacity is when and if this is necessary.

Automation in this process has the potential to help facilitate this process by automatically detecting links that are over-utilized and computing alternate tactical paths for select traffic to mitigate the congestion. Typically, TTE paths are computed edge-to-edge which involves expensive computation, and requires formulation of a traffic matrix to have visibility of traffic flows edge-to-edge. Router instrumentation requirements are not met by typical cost-optimized edge devices. It is also difficult to support at scale and through automation.

BRIEF DESCRIPTION OF THE DRAWINGS

FIG. 9 illustrates a first configuration user interface according to an example embodiment.

FIG. 12 illustrates an LCM Operational Dashboard in accordance with an example embodiment.

DESCRIPTION OF EXAMPLE EMBODIMENTS

Overview

Figure 1A:
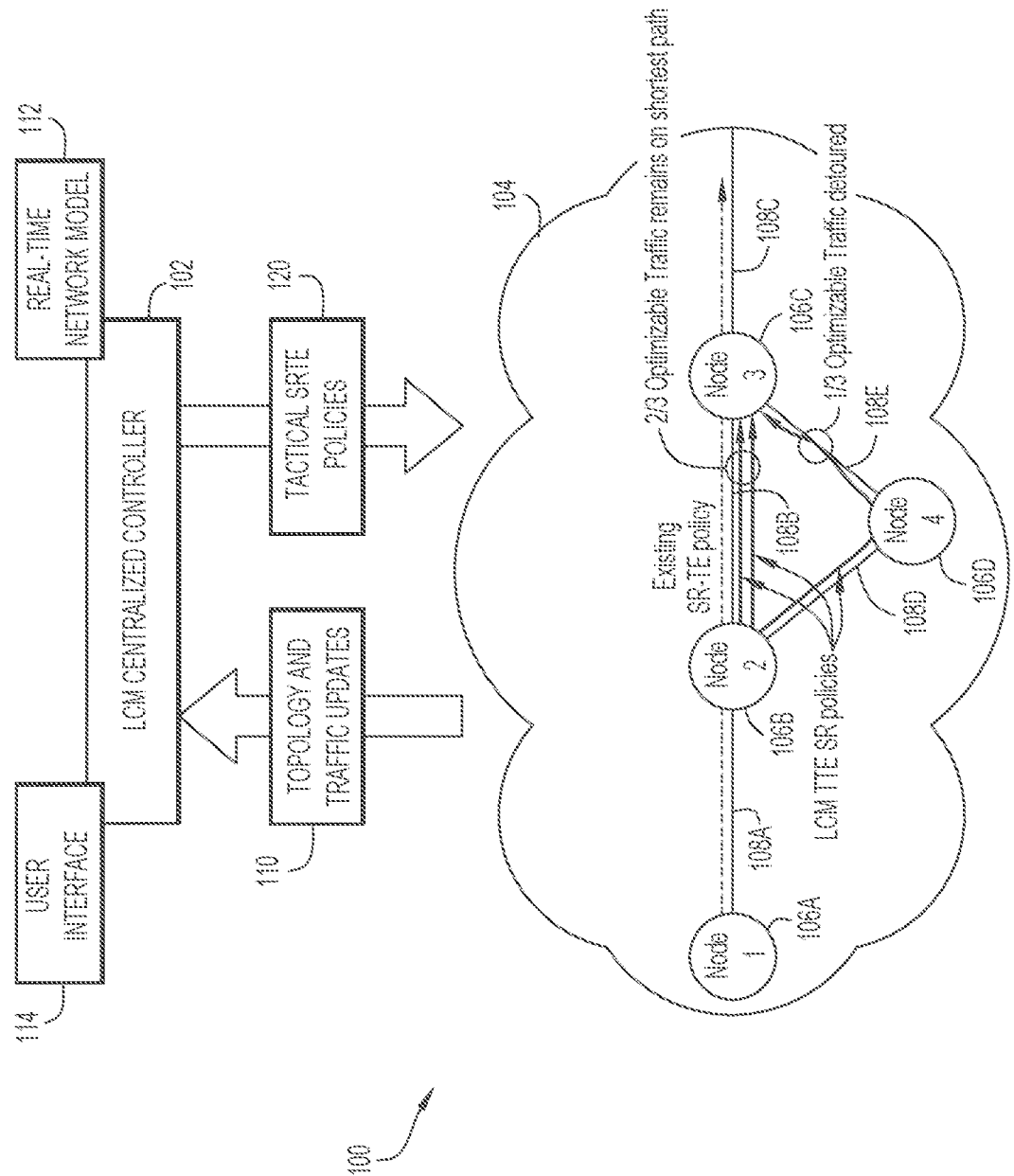
FIG. 1A is an overview diagram of a system that performs local congestion management (LCM) in accordance with an exemplary embodiment.

Presented herein are techniques for Local Congestion Mitigation (LCM) that reduce transient congestion by computing alternate paths through available capacity local to the point of congestion. This eliminates the requirement for a full, edge-to-edge traffic matrix and instead focuses on the traffic flowing over the congested interface and the links in the near topological vicinity that may be used for tactical detour paths. Eliminating the traffic matrix requirement and instead using localized congestion mitigation can allow support for larger scale networks and reduce the dependencies and caveats that known techniques have, which limit where such techniques can be deployed.

In one form, a method includes determining that a network interface between a first intermediate network node and a second intermediate network node is experiencing congestion caused by network traffic, the first intermediate network node identified by a first network address and the second intermediate network node identified by a second network address; identifying, based on the determined congestion, and the second network address, a first set of alternate routes from the first intermediate network node to the second intermediate network node; and rerouting a first portion of the network traffic over one or more of the alternate routes in the set of alternate routes.

EXAMPLE EMBODIMENTS

TTE is a technique to mitigate congestion by re-routing some traffic over alternate paths in the network with available capacity. Typically, this is done by computing an edge-to-edge segment routing (SR) policy, or multiple SR polices. However, computing edge-to-edge SR policies is an expensive computation, and requires formulation of a traffic matrix to understand traffic flows edge-to-edge. Edge-to-edge considerations are made more challenging in that typical edge devices do not implement sufficient instrumentation to perform such computations accurately. It is also difficult to support at scale and through automation.

Presented herein is a new approach to TTE called Local Congestion Mitigation (LCM). LCM localizes the TTE computations within a point of congestion by computing alternate paths between network nodes on either side of a congested interface. This eliminates a requirement for a full, edge-to-edge traffic matrix and instead focuses on the traffic flowing over the congested interface and the links in the near topological vicinity that may be used for alternate traffic paths. Eliminating the traffic matrix requirement and utilizing localizing congestion mitigation can support larger scale networks and reduce dependencies and caveats of known techniques. This increases the environments in which congestion can be effectively mitigated relative to those known techniques.

Thus, LCM mitigates congestion via a scalable and lightweight approach that is widely applicable in a variety of network architectures. As discussed above, LCM mitigates congestion locally around a congested interface. To mitigate congestion, policies are deployed to a headend and endpoint of intermediate network nodes on either side of a congested link. The policies are generated to avoid causing any further congestion on the alternate links selected to offload congestion from the congested link.

LCM provides scalability by eliminating a need to simulate edge-to-edge traffic flows in the network through a derived or measured traffic matrix. A full traffic matrix (e.g., that includes end-to-end flows) is both expensive to create and costs scale exponentially as node counts increase. By focusing on the link under congestion and how traffic can be rerouted on local alternate paths to the other side of the congested link, determination of edge-to-edge traffic flows is limited or even non-existent. This decouples LCM's ability to mitigate congestion on an interface from a size of the overall network.

Another objective for LCM is to minimize dependencies and requirements on the underlying network devices. The localized nature of LCM achieves this by limiting the scope of LCM functionality and its requirements to the devices and interfaces being protected by LCM. Some embodiments of an LCM based solution also minimize a need for specialized router configurations, such that LCM can make use of a large number of off the shelf routers.

Finally, LCM may be widely applicable across networks of varying topologies and architectures. LCM is not limited based on Interior Gateway Protocol (IGP) area boundaries or IGP domain boundaries like edge-to-edge solutions. This provides more flexibility to deploy LCM where needed in the network.

FIG. 1A is an overview diagram of a system that performs LCM in accordance with an exemplary embodiment. The system 100 of FIG. 1A includes a LCM controller 102. The LCM controller 102 manages a network 104 that includes at least four network nodes illustrated in FIG. 1A as a first network node 106A, a second intermediate network node 106B, a third intermediate network node 106C, and a fourth intermediate network node 106D. Intermediate network nodes are nodes that are not end points of a communication. In other words, an address of an intermediate network node is not included as a source address or a destination address in packet traffic. Instead, intermediate network node addresses are listed in routing tables and provide an intermediate destination for packets traveling from a source node to a destination node. In the system 100 of FIG. 1A, the first network node 106A is a source node, while each of the other nodes are intermediate nodes. A destination node is not illustrated in FIG. 1A.

FIG. 1A illustrates a network path that includes the first network node 106A and the third intermediate network node 106C includes three segments: first network segment 108A, and a second network segment 108B. After the third intermediate network node 106C receives traffic from the first network node 106A, the third intermediate network node 106C may forward the traffic over a third network segment 108C. The LCM controller 102 identifies a topology of the network 104 and receives topology information and traffic updates 110 from the network 104. Based on the topology information and traffic updates 110, the LCM controller 102 is able to identify that the second network segment 108B is experiencing congestion. The LCM controller 102 maintains a model 112 (e.g. a real-time model in some embodiments) of the network 104 based on the topology information and traffic updates 110. The model 112 is used to simulate conditions within the network 104 and the LCM controller 102 then identifies the congestion of the second network segment 108B based on the network traffic simulation provided by the model 112.

Based on the model 112, the LCM controller 102 generates one or more tactical segment routing traffic engineering (SRTE) policies designed to alleviate the congestion conditions of the second network segment 108B. To determine alternate network paths for the traffic carried by the second network segment 108B, the LCM controller 102 determines an alternate network path from the second intermediate network node 106B to the third intermediate network node 106C, and for traffic flowing in the opposite direction, an alternate network path from the third intermediate network node 106C to the second intermediate network node 106B.

Thus, a determination of an LCM policy does not generally consider a source node or an end destination node of the traffic (e.g. a source address or destination address specified in an IP header of traffic being rerouted). Instead, the LCM policy is determined based on a "next hop" address of the traffic, e.g. an address of the third intermediate network node 106C for traffic flowing from the first network node 106A to be carried by third network segment 108C, and/or an address of the second intermediate network node 106B for traffic flowing from the third intermediate network node 106C to the first network node 106A.

In some embodiments, the LCM controller 102 causes presentation of a user interface 114 to display the determined one or more SRTE policies. In some embodiments, the user interface 114 is configured to provide an ability for an operator to select or otherwise approve deployment/instantiation of the one or more SRTE policies at the second intermediate network node 106B and/or the third intermediate network node 106C.

Assuming the one or more SRTE polices are approved by an operator via the user interface 114, the generated one or more of the policies 120 are then instantiated on one or more of the network nodes 106A-D. Instantiating of the policies 120 on the one or more network nodes 106A-D causes at least a portion of the traffic from the first network node 106A carried over the second network segment 108B to be rerouted over a fourth network segment 108D and then over a fifth network segment 108E. Traffic received by the third intermediate network node 106C via the third network segment 108C and destined for the first network node 106A is detoured by the SRTE polices to be carried from the third intermediate network node 106C to the fifth network segment 108E and then over the fourth network segment 108D, before being transmitted to the first network node 106A via the first network segment 108A by the second intermediate network node 106B.

After deployment of the SRTE policies, the LCM controller 102 continues to monitor conditions on the network 104 via the model 112. In some embodiments, metrics including operational parameters of the network 104 are evaluated against one or more criteria to determine when the congestion condition of the second network segment 108B has been alleviated, and it may be appropriate to return routing over the second network segment 108B to a nominal state by withdrawing the SRTE policies. Thus, after the congestion condition is alleviated, the LCM controller 102 instantiates SR policies to return the rerouted traffic to its original path that utilizes the second network segment 108B.

Figure 1B:
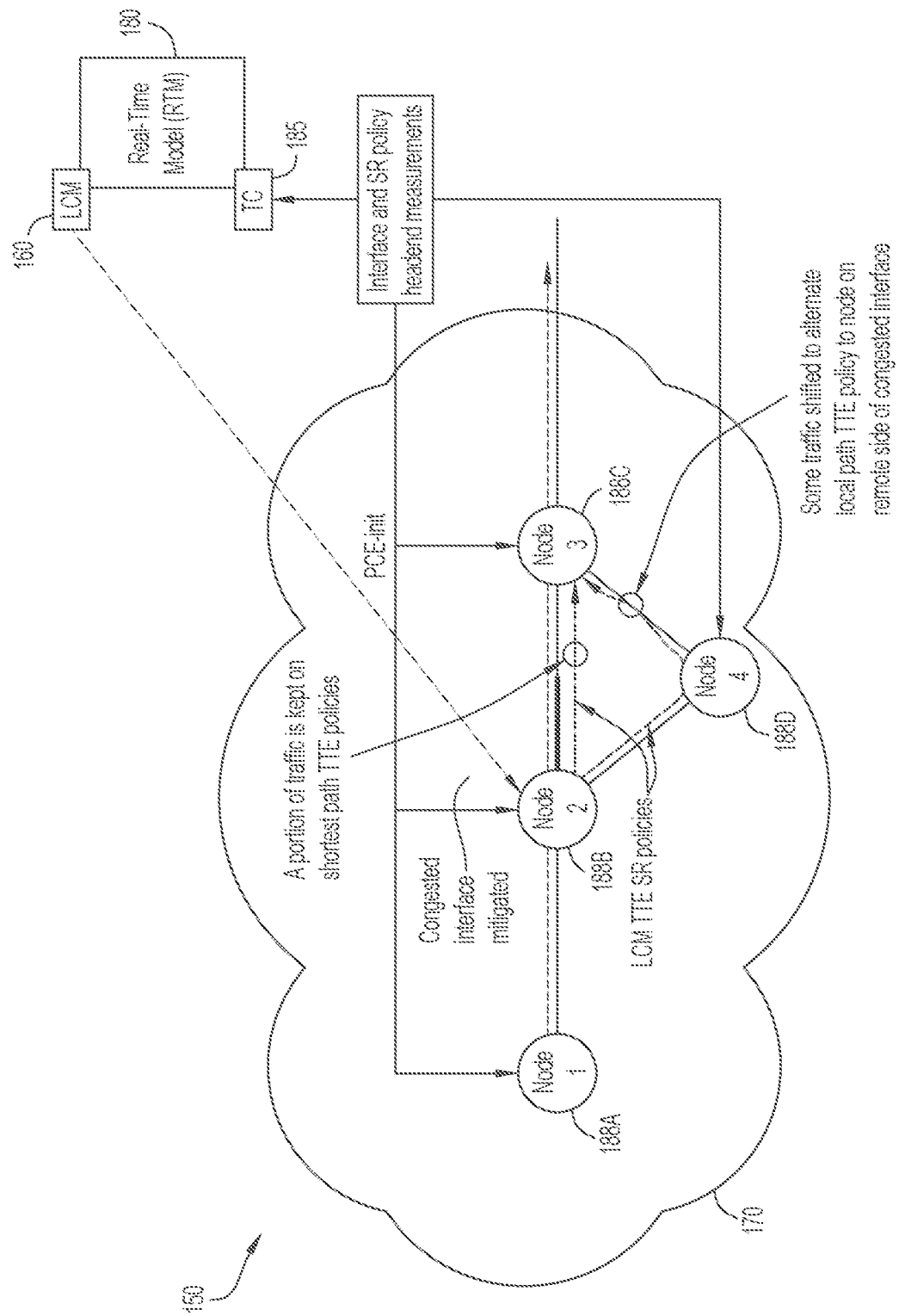
FIG. 1B shows another diagram of a system implementing an LCM architecture in accordance with an example embodiment.

FIG. 1B shows another embodiment of a system implementing an LCM architecture in accordance with an example embodiment. Similar to the LCM architecture of system 100 of FIG. 1A, the LCM architecture 150 of FIG. 1B includes an LCM controller 160 that is responsible for monitoring a network 170 for congested interfaces, computing TTE solutions to mitigate the congestion and deploying them to the network 170. FIG. 1B also illustrates a model 180 of the network. The model 180 is analogous to the model 112 discussed above with respect to FIG. 1A and represents a topology of the network 170, SR policies applied to the network 170 and a path computation engine. FIG. 1B also shows a traffic collector (TC) 185. The TC 185 is configured to collect and provide metrics indicating measured traffic for interfaces and existing SR policies into the model 180.

FIG. 1B also illustrates network nodes. In the example of FIG. 1B, the network nodes include a router 188A, a router 188B, a router 188C, and a router 188D. Each of the routers 188A-D have interfaces being protected by the LCM controller 160. Each of the routers 188A-D perform one or more of instantiate TTE policies, load balance LCM eligible traffic onto parallel TTE policies, or provide, to the TC 185, traffic measurements for interfaces and TTE policies.

In some embodiments, traffic carried over a congested link is prioritized according to whether the traffic is controlled by an existing SR policy. For example, in some embodiments, traffic that is outside of an existing SR policy is eligible to be steered onto LCM TTE policies. Thus, in these embodiments, traffic on existing SR policies traveling over a congested network segment will remain on their programmed paths, and thus continue to be carried by that network segment. How much traffic is eligible for re-routing determines an ability for the LCM controller 160 to mitigate a congested network segment. A determination of which traffic is eligible is based, in at least some embodiments, on statistics or other metrics provided to the LCM controller 160 from the network 170 by the TC 185.

Traffic Selection Based on an IGP Algorithm

In some embodiments, the LCM controller 160 instantiates TTE SR policies on each router with an interface being mitigated. Steering of traffic onto the TTE SR policies can be controlled using labels associated with IGP algorithms. For LCM eligible traffic, unlabeled and SR labeled with a regular (algo-0) security identifier (SID) can be used to steer the traffic onto the TTE SR policies. Traffic that is ineligible to be steered onto TTE SR policies use one or more of the following types of SIDs: strict shortest path first (SSPF) (algo-1), Adjacency, or a Flex-Algorithm. In some embodiments, an intermediate network node (e.g. a router) in a network managed via LCM policies has strict SIDs configured for use by SR policies (both LCM and others).

Traffic Selection Based on Quality of Service (QoS) Marking

In some embodiments, finer grained control of traffic eligible to be steered into LCM TTE policies is achieved. Traffic eligible for LCM optimization is marked at ingress with an appropriate QoS Differentiated Services Code Point (DSCP) or multi-protocol label switching (MPLS) experimental bits (EXP). Routers then selectively steer this traffic into tactical SRTE policies based on classification and policy based tunnel selection.

LCM Eligible Traffic Estimation

In some embodiments, an amount of traffic eligible for optimization is estimated in an initial deployment of TTE policies. The estimation is based on metrics including, for example, an interface utilization of a congested interface. An amount of traffic on each existing SR policy routed across the interface is then subtracted from the interface utilization. The TC 185 will collect, in some embodiments, SR policy counters from headend routers. This data is inserted into the model 180. The non-optimizable traffic on existing edge SR policies being routed over the interface is approximated, in some embodiments, based on assumptions of ECMP splitting. Some embodiments of the model 180 assume even ECMP splitting of traffic along the IGP path of SR policies with prefix SIDs, since traffic collection is done, in some embodiments, at the SR policy headend. This may not always be accurate, especially if there are elephant flows that cannot be evenly split over ECMP. To compensate for this error source, some embodiments of the LCM controller 160 employ a self-correction step after TTEs are first deployed. This self-correction step evaluates whether congestion still exists due to errors in the initial optimizable traffic approximation. New estimates are then formulated with appropriate SR policies generated to correct for the initial estimate error.

Figure 2:
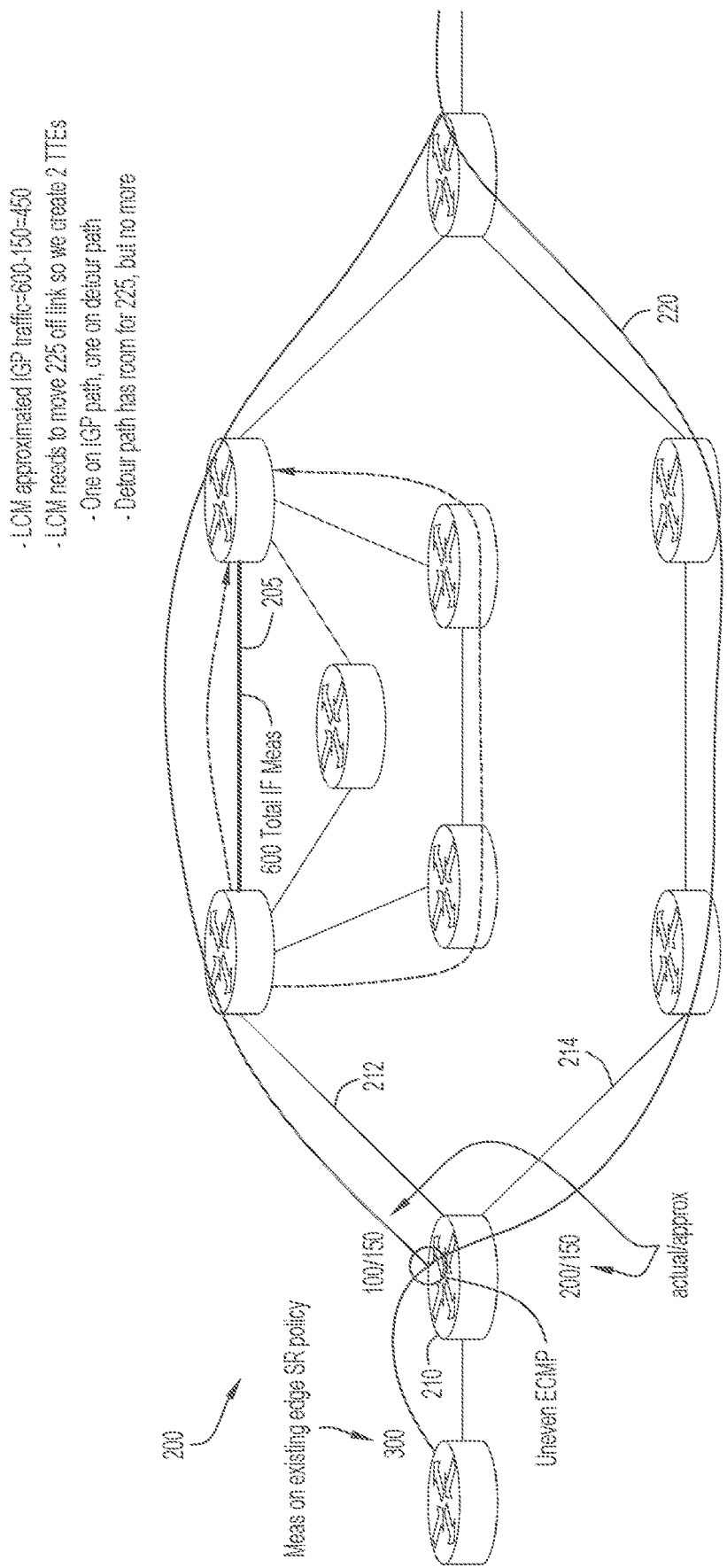
FIG. 2 illustrates a first mitigation of a congested network segment in accordance with an example embodiment.

FIG. 2 illustrates mitigation of a congested network segment of a network 200 in accordance with an example embodiment. In the example of FIG. 2, a network segment 205 is congested. To mitigate the congestion at the network segment 205, an edge SR policy is applied to traffic at the intermediate network node 210. The SR policy at the intermediate network node 210 implements an Equal Cost Multi-Path (ECMP) splitting upstream of the network segment 205 (splitting traffic across network segment 212 and network segment 214). When LCM first attempts to approximate the optimizable traffic, it assumes even splitting of the 300 Mbps of traffic on this policy, resulting in an expected 150 Mbps carried over the network segment 205. This provides for an expected 450 Mbps of optimizable traffic since a modeling of traffic flowing over the network segment 205 is 600 Mbps. In this hypothetical, the ECMP splitting is uneven and only 100 Mbps of the existing SR policy is flowing over the interface. Thus, the model inaccurately predicted a route for 50 Mbps of traffic. This leads to an under-estimation of the optimizable traffic and in this case (450 Mbps v 500 Mbps), and thus more than the expected traffic is sent over the detour path 220. Thus, instead of 225 Mbps being sent along the detour path 220 (e.g. half of 450 Mbps), 250 Mbps is sent along the detour path (e.g., one-half of 500 Mbps). This results in congestion along the detour path 220, since the detour path 220 has a capacity of 225 Mbps.

In a subsequent round of optimization by the LCM controller, congestion is detected along the detour path 220. This additional congestion triggers a re-optimization, discussed below with respect to FIG. 3.

Figure 3:
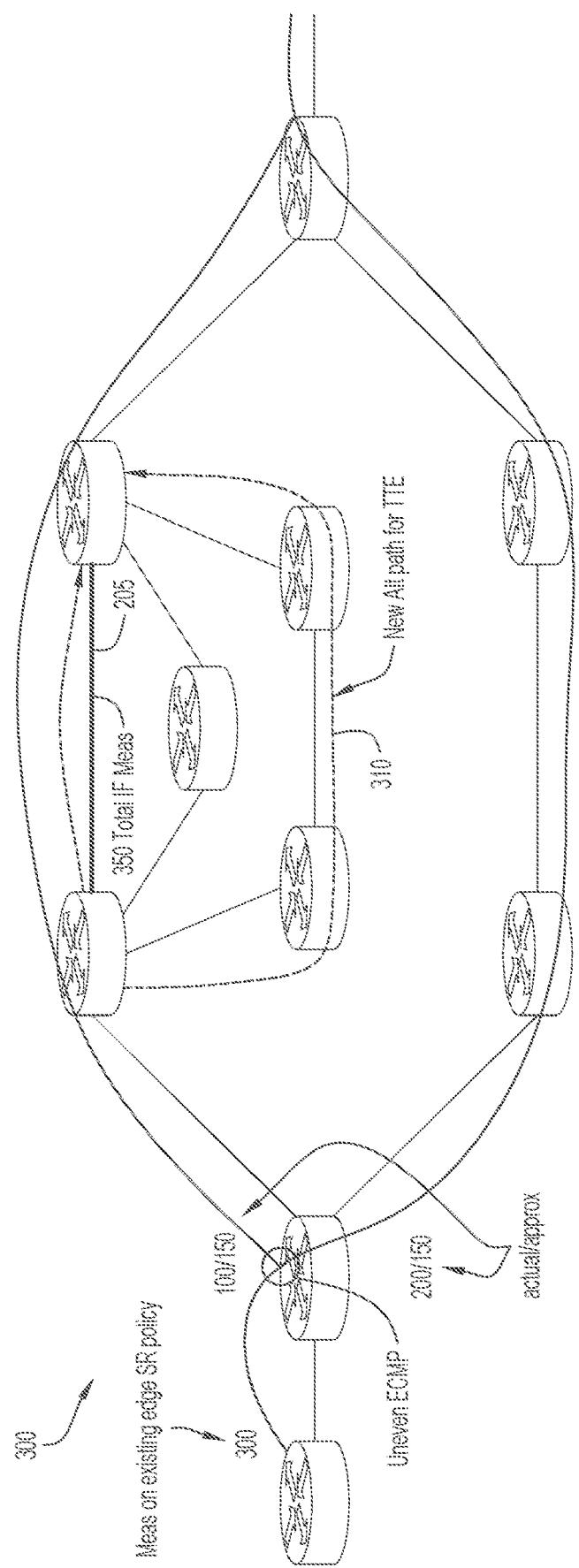
FIG. 3 illustrates a second mitigation performed subsequent to the first mitigation of FIG. 2, in accordance with an example embodiment.

FIG. 3 illustrates a second mitigation performed subsequent to the first mitigation of FIG. 2, in accordance with an example embodiment. An approximation of optimizable traffic can be improved relative to the approximation performed with respect to FIG. 2, as measurements from the headend of the LCM TTE policies installed as part of the previous optimizations of FIG. 2 are now available and applied to the network 300 of FIG. 3. These measurements indicate to the LCM controller how much optimizable traffic is actually carried by the network segment 205. In this case, the under-approximation is corrected, resulting in a new path 310 selected for the detour policy that will prevent congestion along its path.

During the optimization of FIG. 3, the LCM controller determines there is 350 Mbps carried by the network segment 205. Two TTE polices are each experiencing 250 Mbps of measured traffic. One foreign policy indicates 300 Mbps of measured total traffic, some of which is flowing over the network segment 205. The LCM controller may then remove the TTE polices instantiated during the optimization of FIG. 2. This revocation of TTE polices returns traffic back to its original path over the network segment 205. During the second round of optimization, the LCM controller determines an amount of traffic carried by the network segment 205 is 500 Mbps, and that 225 Mbps needs to be detoured away from the network segment 205. The LCM controller thus creates two TTE policies. One of the TTE policies routes 250 Mbps over the new path 310 that can accommodate the 250 Mbps, resulting in a mitigation of the congestion.

Determining LCM Optimizable Traffic Through Measurements

Some embodiments avoid estimating an amount of LCM optimizable traffic flowing over a congested interface by pre-deploying a one-hop SR policy between the nodes on either side of the congested interface. The one-hop (SR) policy is configured to enable collection of metrics, such as traffic measurements when an interface is approaching congestion. The one-hop SR policy is configured to maintain traffic on its current IGP path even as it is steered onto it. Traffic measurements will then be available from the headend indicating to the LCM controller how much traffic is optimizable. This information is then used, under some circumstances, to mitigate congestion on the interface. This approach includes some similarities to the two step LCM optimization discussed above with respect to FIGS. 2 and 3, except that instead of instantiating SR polices based on estimates provided by the model, the one-hop SR polices are pre-deployed to obtain measurements of optimizable traffic. Unlike the embodiment of FIG. 2, instantiation of the one-hop SR policy will not send traffic over alternate paths without accurate estimates of traffic flowing over those alternate paths. Thus reduces a risk that errors in the estimation of optimizable traffic that result in congestion of alternate network segments or paths.

In some embodiments, pre-deployment of one-hop SR polices to collect traffic information is triggered at a first utilization level that is below a second utilization level used to control deployment of SR policies that mitigate congestion. In some embodiments, when the first utilization level is reached, an LCM controller deploys one or more one-hop SR policies to determine an amount of optimizable traffic. If the interface utilization rises above the second utilization level, the measurements will are used to compute a more accurate initial set of TTE SR policies, which are then instantiated on the intermediate nodes bounding the congested network segment.

Traffic Distribution Mechanisms

Figure 4:
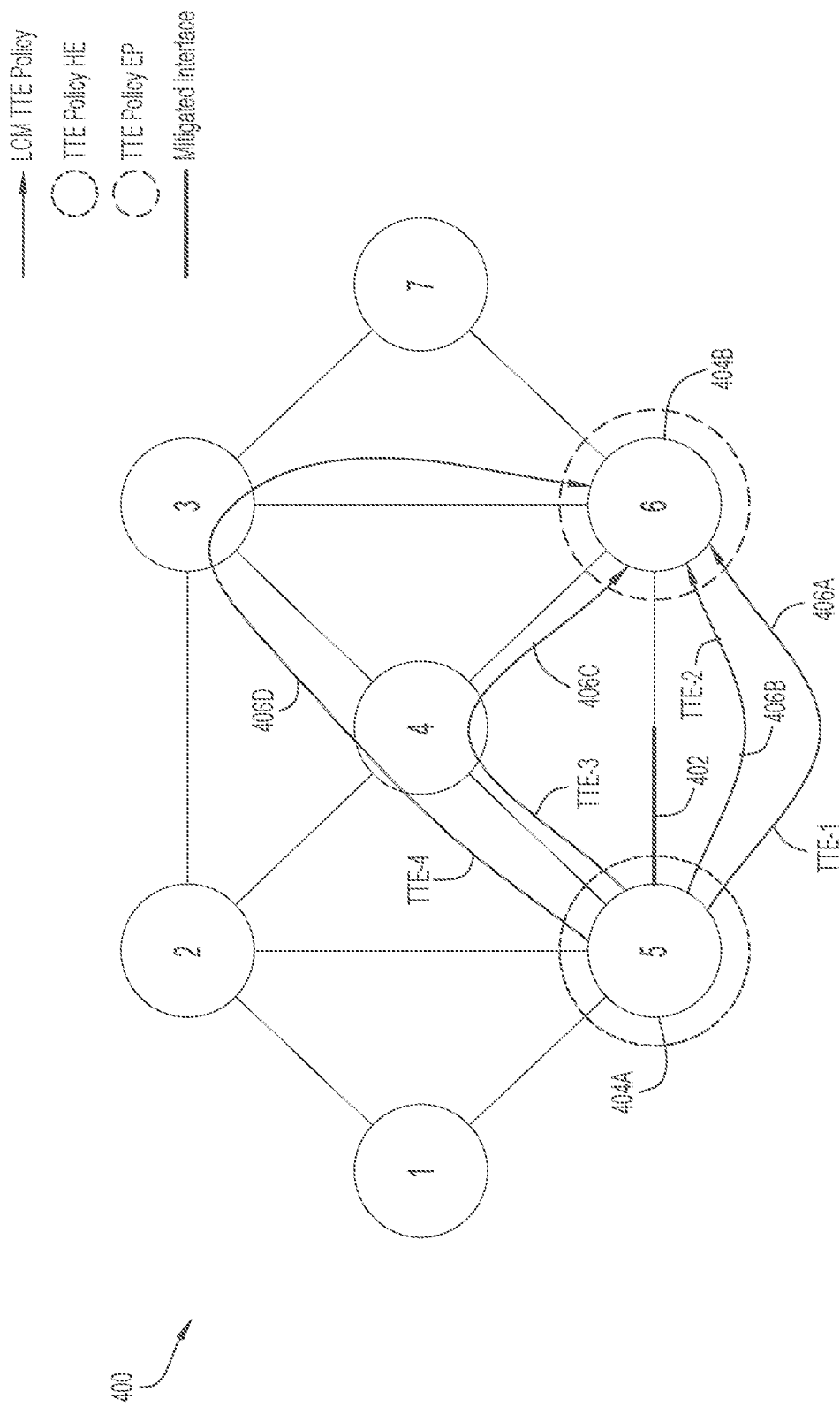
FIG. 4 illustrates deployment of multiple parallel TTE policies to mitigate an interface according to an example embodiment.

FIG. 4 illustrates deployment of multiple parallel TTE policies to mitigate an interface according to an example embodiment. FIG. 4 shows a network 400 that includes a network segment 402 between a first intermediate network node 404A and a second intermediate network node 404B. Multiple parallel TTE policies have been implemented via network paths 406A-D. Each of network paths 406C and 406D includes multiple network segments. Use of multiple parallel TTE policies as shown in FIG. 4 provides a coarse level of control over how much of the LCM eligible traffic goes on each of the paths computed, both the alternate paths (e.g., each of network paths 406C and 406D) and the shortest IGP path (network paths 406A and 406B). This approach assumes roughly even ECMP splitting among the parallel TTE policies 406A-D. The actual splitting may vary from this based on the amount of optimizable traffic and the prevalence of elephant flows. If the network 400 supports multiple segment lists with weighted Unequal Cost Multi-Path (UCMP), this capability can be employed to enable more granular control of how much traffic is sent on each of the alternate paths. This capability also allows for correction for uneven ECMP splitting via adjustment of weights.

Congestion Detection

In some embodiments, an LCM controller evaluates the network for congested interfaces on a scheduled basis. During an evaluation, the LCM controller consults a model of the network to detect congested interfaces. In some embodiments, an interface is considered congested if a traffic utilization of the interface is greater than a predefined LCM utilization threshold for that interface. The predefined LCM utilization is a fixed, global threshold in some embodiments or a threshold defined by a user interface that is specific to the interface in other embodiments (e.g. see FIG. 11 and the threshold percent utilization 1106 for an example).

TTE Policy Management

TTE Policy Removals

Figure 5:
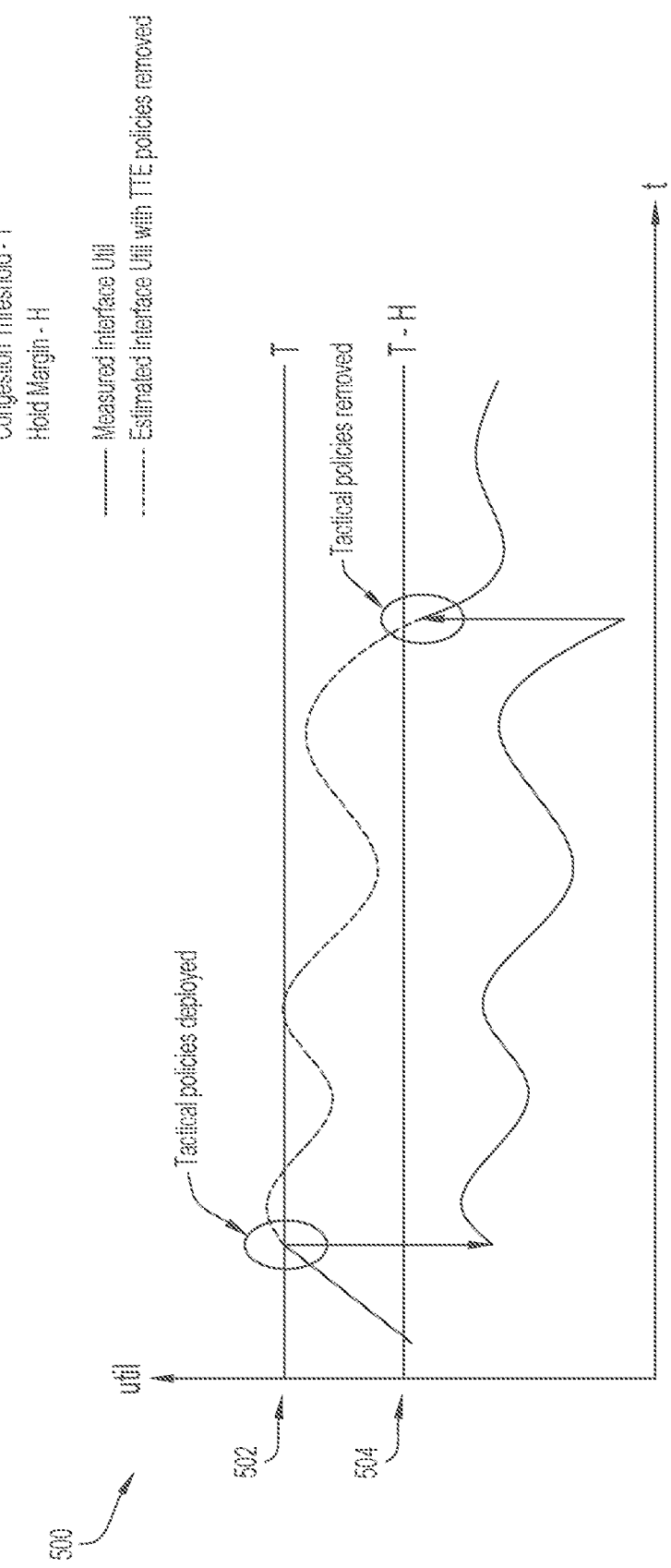
FIG. 5 illustrates use of two separate thresholds for instantiation of congestion mitigation policies and removal of the same according to an example embodiment.

FIG. 5 illustrates use of two separate thresholds for instantiation of congestion mitigation policies and removal of the same, according to an example embodiment. Some embodiments provide a first traffic threshold 502 for deployment of one or more TTE polices to mitigate a congestion condition. For example, in some embodiments, a traffic volume or throughput over a network is compared to the first traffic threshold 502. If the traffic volume or throughput is above the first traffic threshold 502, the network segment is considered to be congested, and subject to mitigation methods at least in some embodiments.

Once an LCM controller deploys TTE policies configured to mitigate the congestion, the LCM controller continues to monitor the network so as to determine when those congestion mitigation polices are no longer needed. Some embodiments determine when a network segment no longer requires congestion mitigation polices by comparing an amount or throughput of traffic carried by the network segment or subject to being carried by the network segment to a second traffic threshold 504. Thus, some embodiments determine an amount of traffic carried by a network segment if the congestion mitigation polices were removed. If that amount of traffic is below or otherwise transgresses the second traffic threshold 504, then the congestion mitigation polices are removed.

Thus, generally, TTE policies are no longer needed when the interface they mitigate would not be congested if they were removed. Some embodiments of an LCM controller perform a what-if analysis to estimate the interface utilization without the TTE policy set for the interface. To dampen removals and prevent churn of adding TTE policies and then soon after, removing them as the interface utilization oscillates around the congestion threshold, a hold margin (e.g. a difference between the first traffic threshold 502 and the second traffic threshold 504) is configured to control instantiation and removal of TTE policies.

The hold margin is used to determine how much below the first traffic threshold the interface utilization should be without a TTE policy in place before the TTE polices are removed. A larger hold margin causes TTE policy sets to be "stickier" once deployed, while a smaller hold margin will remove the TTE policies more quickly when congestion subsides. Some embodiments provide a user interface that allows a user to set the hold margin based on their overall objectives and trade-offs between churn and responsiveness.

LCM Workflow

Figure 6:
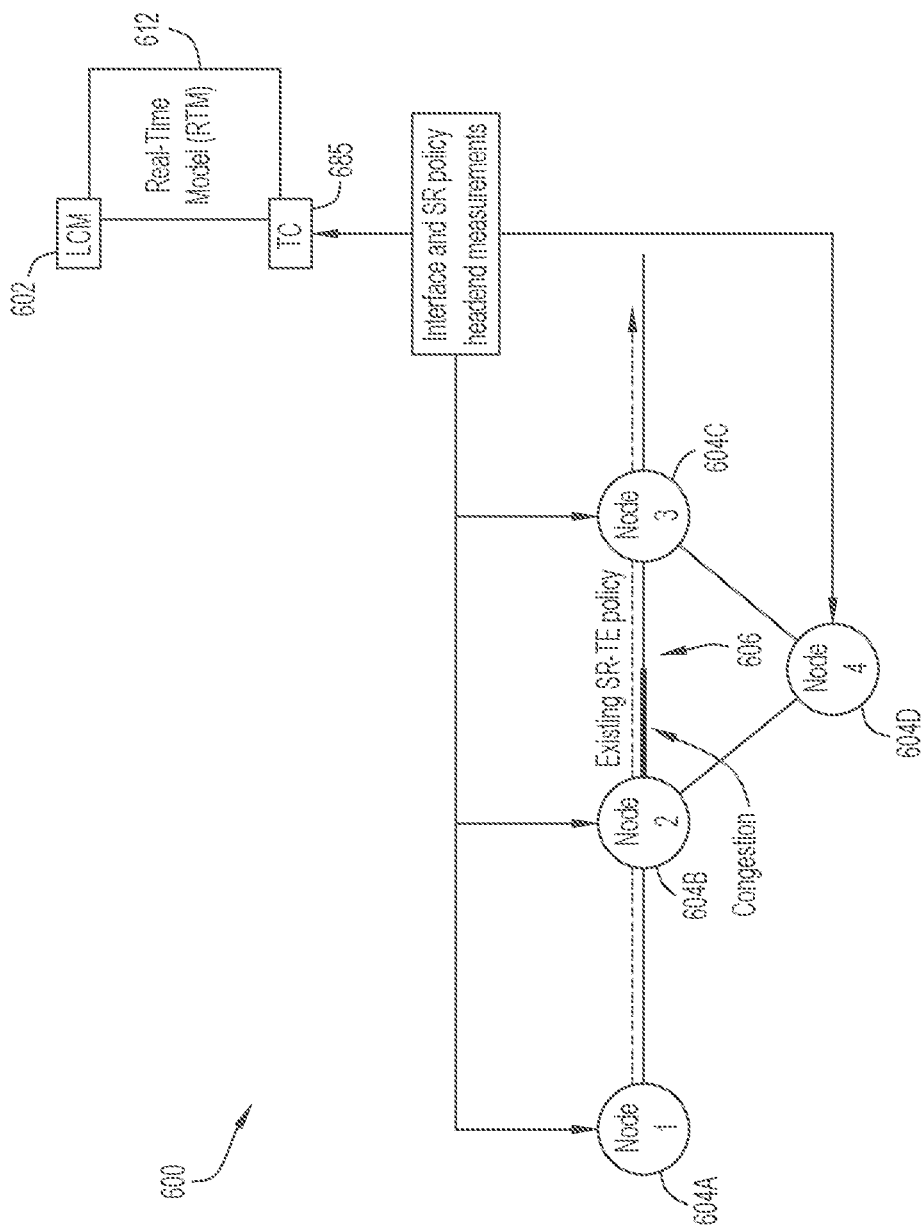
FIG. 6 illustrates a network including a congested network segment in accordance with an example embodiment.

FIG. 6 illustrates a network 600 including a congested network segment in accordance with an example embodiment. FIG. 6 shows an LCM controller 602 monitoring the network 600 that includes a network node 604A, a first intermediate network node 604B, a second intermediate network node 604C, and a third intermediate network node 604D. The LCM controller 602 monitors the network 600 by consulting a model 612 (e.g., analogous to the model 112 or the model 180). A TC 685 (analogous to the TC 185 discussed above) collects metrics reflecting performance of the network 600, which include, in some embodiments, interface and SR policy traffic measurements, and populates the model 612. The LCM controller 602 compares the interface measurements with predefined thresholds defined to detect congestion. If an interface exceeds its corresponding threshold, the LCM controller 602 determines the interface is congested and should be mitigated. In the example in FIG. 6, the LCM controller 602 detects that the interface on the first intermediate network node 604B in communication with the second intermediate network node 604C via network segment 606 is at 80% utilization. However, a congestion threshold for the interface is defined to be 70%. Thus, the LCM controller determines the network segment 606 is congested.

Once the LCM controller 602 has detected congestion, an amount of traffic on that interface that is subject to being steered via LCM TTE SR policies is estimated. In some embodiments, LCM eligible traffic is traffic not already controlled by an SR policy. In some embodiments, LCM controller 602 estimates this using statistics of the interface itself and statistics collected via an SR policy (e.g., collected by the TC 685 and populated in the model 612).

Figure 7:
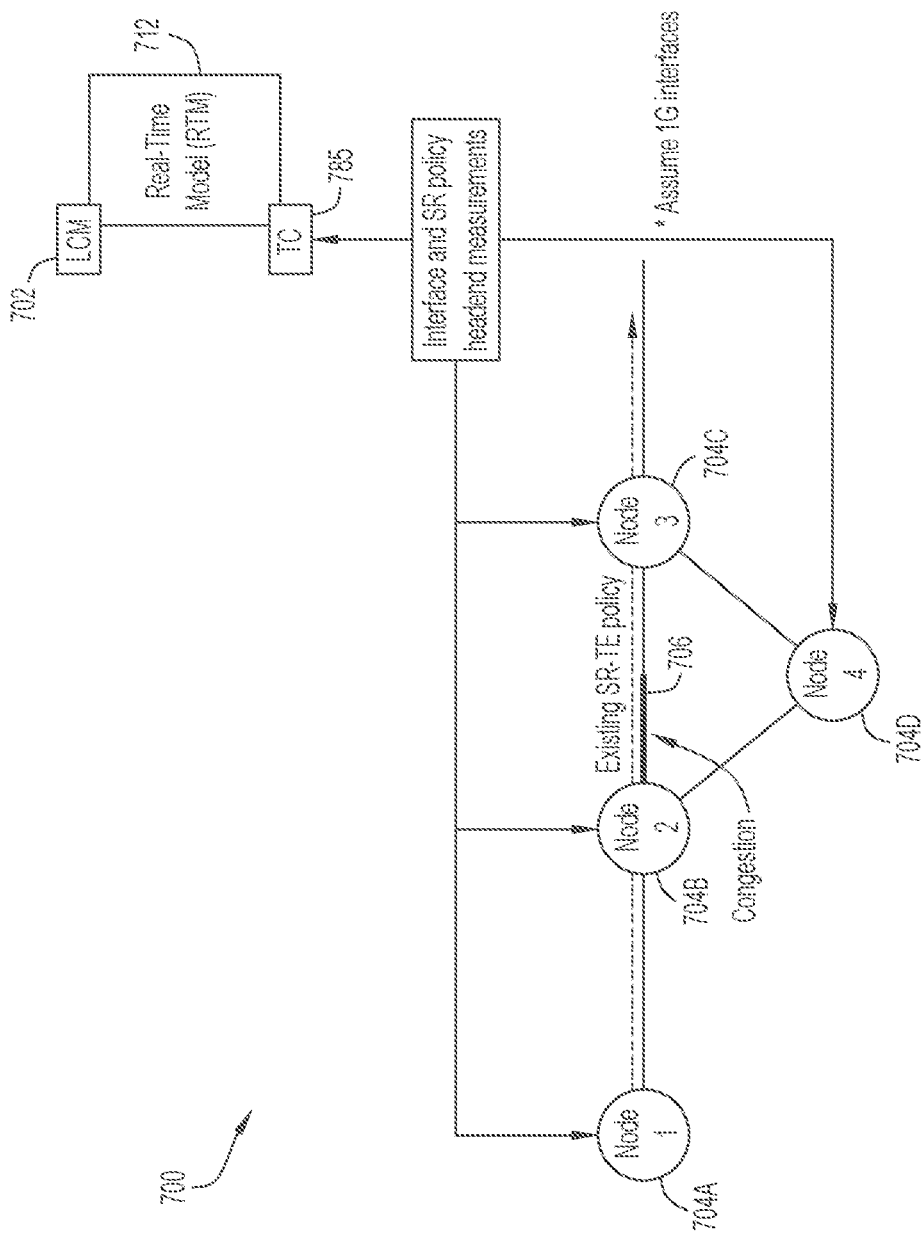
FIG. 7 illustrates a network system performing computation of an amount of LCM eligible traffic according to an example embodiment.

FIG. 7 illustrates a network system 700 performing computation of an amount of LCM eligible traffic according to an example embodiment. An LCM controller 702 monitors the network system 700, which includes a first network node 704A, a second intermediate network node 704B, a third intermediate network node 704C, and a fourth intermediate network node 704D. An LCM controller 702, after consulting a model 712 populated with metrics provided by a TC 785, determines that a network segment 706 is congested. In some embodiments, an amount of eligible LCM traffic is determined based on interface traffic statistics that account for all or at least most traffic carried by the interface. A second amount representing traffic under SR policies that flow over the interface is then subtracted from the amount. This provides a third amount of traffic that is not subject to SR policies, and is thus eligible for re-routing, at least in some embodiments. By identifying traffic outside any SR policy, ECMP splitting of SR policies to appropriately considered to ensure proper accounting of SR policy traffic. Once the LCM eligible traffic is estimated (300 Mbps in the example of FIG. 7), an amount to be sent over alternate paths is determined by subtracting the threshold equivalent traffic from the total traffic on the interface. In the example of FIG. 7, there is a hypothetical 800 Mbps of traffic at an interface of the second intermediate network node 704B. 500 Mbps is a sum of traffic subject to existing SR policies. Thus, there is 300 Mbps of optimizable traffic, or traffic subject to rerouting via LCM polices. In some embodiments, a threshold of 70% is applied. Thus, with 800 Mbps at the interface minus 700 Mbps with a threshold of 70%, there is 100 Mbps of eligible traffic.

Figure 8:
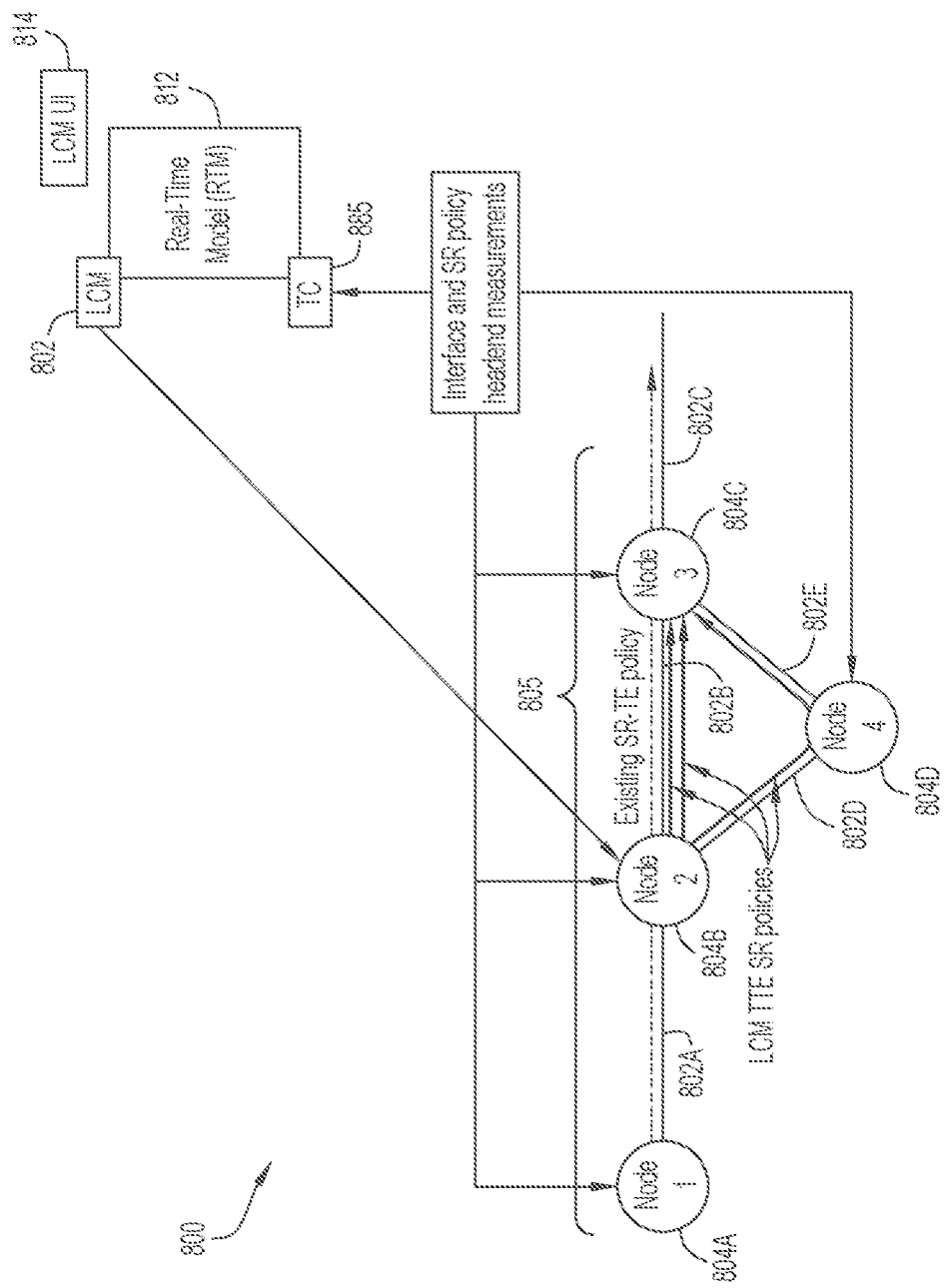
FIG. 8 illustrates a determination of a number of network paths needed to alleviate network congestion, according to an example embodiment.

FIG. 8 illustrates a determination of a number of network paths needed to alleviate network congestion, according to an example embodiment. FIG. 8 shows a network environment 800 including a first network node 804A, a second intermediate network node 804B, a third intermediate network node 804C, and a fourth intermediate network node 804D. A first network segment 802A links the first network node 804A and the second intermediate network node 804B. A second network segment 802B links the second intermediate network node 804B to the third intermediate network node 804C. A third network segment extends beyond the third intermediate network node 804C, to an additional intermediate network node not shown in FIG. 8. A network path 805 is denoted to show a communication flow from the first network node 804A, to the second intermediate network node 804B, to the third intermediate network node 804C, and beyond along the network segment 802C.

In some embodiments, an LCM controller 802 consults a model 812 to determine that the second network segment 802B is congested. The model 812 is based on metrics obtained from a TC 885. In order to alleviate congestion on a congested network segment such as the second network segment 802B, some embodiments, the LCM controller 802 determines how many TTE SR policies are needed and their respective network paths. In some embodiments, this determination is based on a ratio of how much LCM eligible traffic can stay on the shortest (congested) path to an amount that should be routed along alternate routes. This ratio, in some embodiments, is used to determine a number of TTE policies that will be needed on the existing path vs alternate paths (e.g. such as one or more paths including the fourth intermediate network node 804D) respectively. In the example of FIG. 8, the LCM controller 802 needs to reroute at least 100 Mbps of 300 Mbps optimizable traffic to an alternate path or paths.

FIG. 8 illustrates that additional network paths, via the fourth intermediate network node 804D, are determined to have sufficient capacity (e.g. the network paths including a fourth network segment 802D and a fifth network segment 802E). As a result, in some embodiments, the three TTE polices are displayed in a user interface 814 provided by the LCM controller 802. The user interface 814 allows an operator to review and approve use of three TTE polices. Once this change is approved by the operator via the user interface 814, the three TTE polices are deployed at the second intermediate network node 804B and third intermediate network node 804C. Each TTE policy is configured to detour approximately 100 Mbps of traffic using an ECMP type approach. Of the three TTE polices, two utilize the original path over the second network segment 802B (200 Mbps), and one TTE policy routes traffic over a fourth network segment 802D and then a fifth network segment 802E (100 Mbps). Thus, the second intermediate network node 804B instantiates and ECMPs traffic across three TTE policies.

Some other embodiments of the LCM controller 802 attempt to find a suitable alternate path for a single TTE policy that has sufficient capacity to accommodate the expected 100 Mbps of traffic. Paths that minimize total IGP metric are identified, in at least some embodiments. In some embodiments, metrics utilized include one or more of IGP, throughput efficiency (TE) or latency. Once a path is identified, the LCM TTE SR policy set is provisioned in the network.

Figure 9:
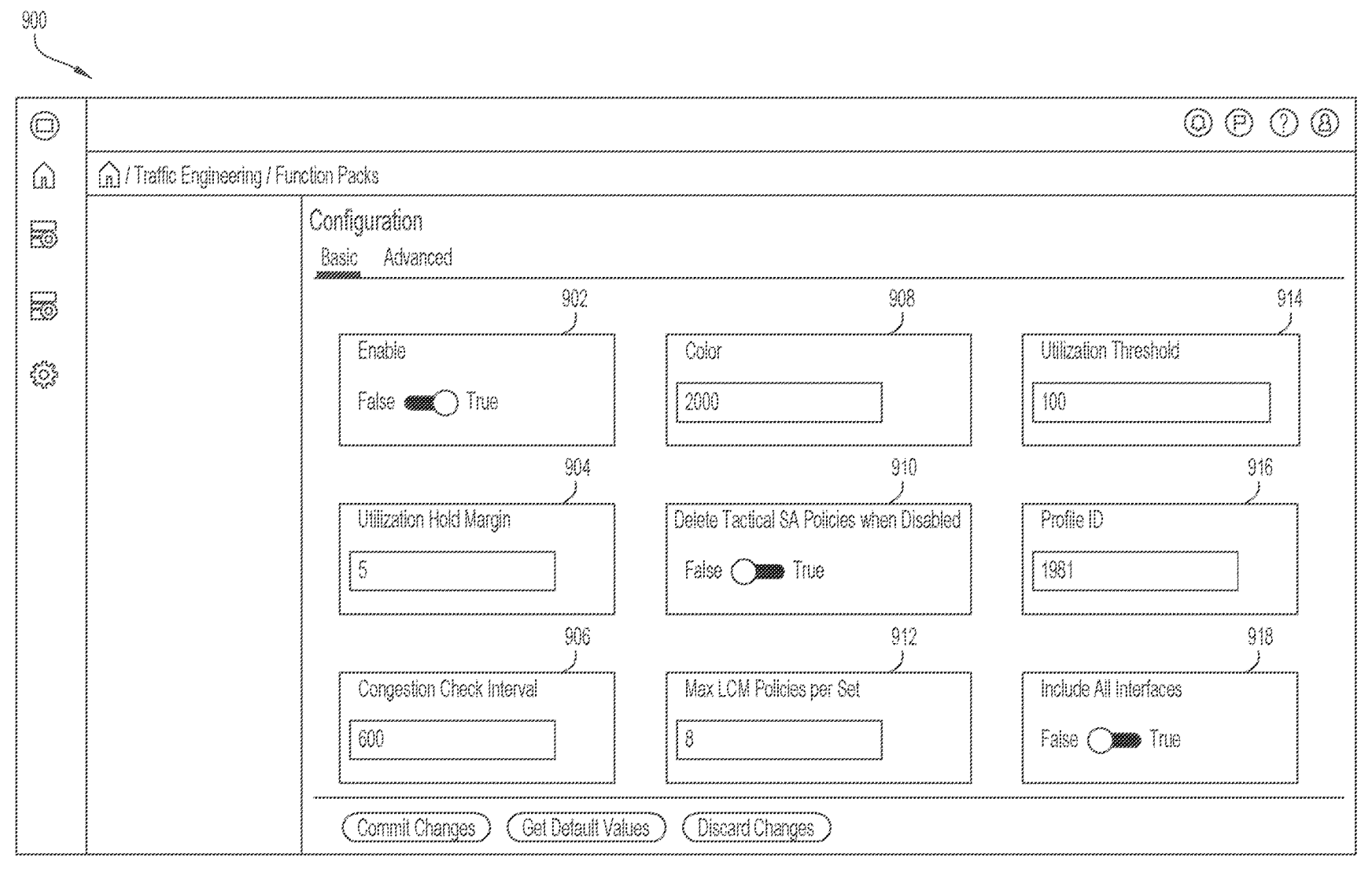

FIG. 9 illustrates a configuration user interface according to an example embodiment. The user interface 900 of FIG. 9 allows an operator to configure parameters associated with LCM. For example, the user interface 900 provides an ability to enable or disable LCM via a control 902. A utilization hold margin, for example as discussed above with respect to FIG. 5, is configured via control 904. How frequently an LCM controller evaluates a model for congestion indications is configured via control 906. The user interface 900 also provides configuration of a color 908, a flag 910 indicating whether tactical SR polices are deleted when disabled, a maximum number of LCM polices per set 912, a utilization threshold 914, a profile identifier 916, and an "include all interfaces" flag 918.

Figure 10:
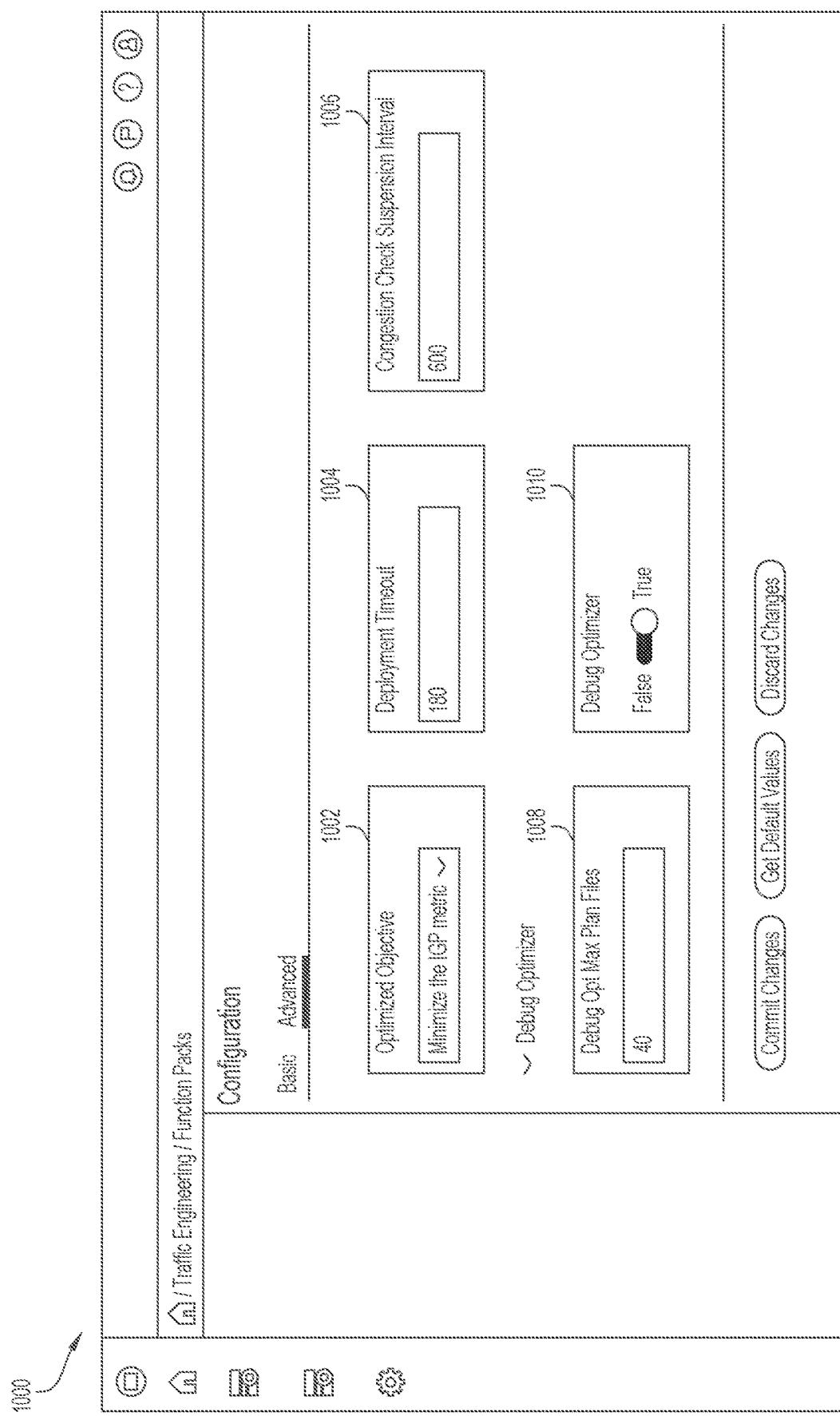
FIG. 10 illustrates a second configuration user interface according to an example embodiment.

FIG. 10 illustrates a second configuration user interface according to an example embodiment. The user interface 1000 of FIG. 10 allows an operator to configure additional parameters associated with LCM functionality as described above. For example, the user interface 1000 provides an ability to set an optimization objective 1002. As shown, the optimization objective set in the user interface 1000 is to minimize an IGP metric. Other options include, in some embodiments, minimization of a traffic engineering (TE) metric, or minimization of latency. The user interface 1000 also allows an operator to configure a deployment timeout parameter 1004 (e.g. in seconds). A congestion check suspension interval 1006 is configured via the user interface 1000. Debug optimizer parameters are also configurable via the user interface 1000. For example, the user interface 1000 allows the operator to configure a maximum number of debug optimization plan files 1008, and to set a debug optimizer parameter value 1010 to either true or false.

Figure 11:
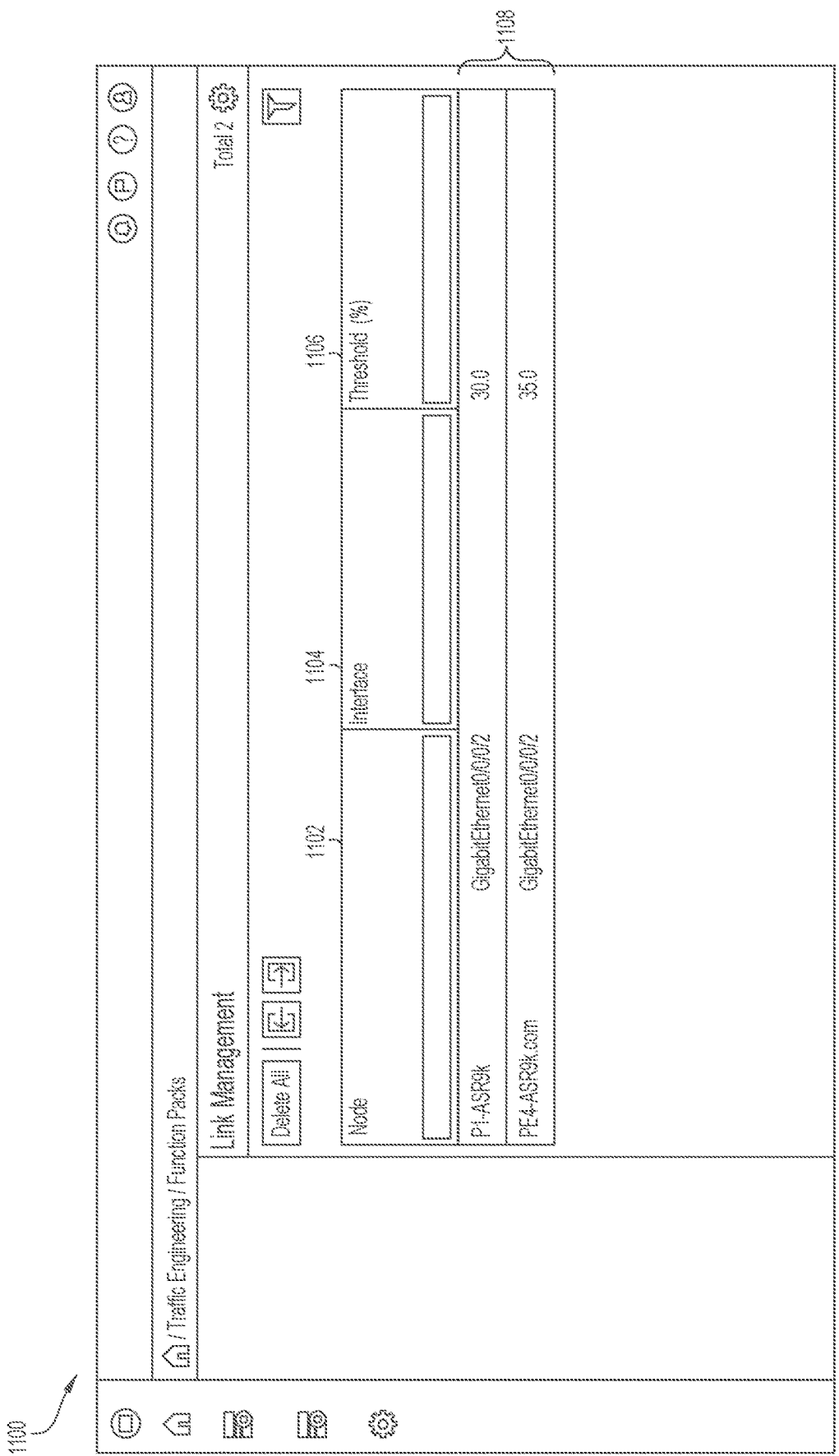
FIG. 11 illustrates a link management user interface according to an example embodiment.

FIG. 11 illustrates a link management user interface according to an example embodiment. The link management user interface 1100 allows for configuration and/or display of one or more interfaces managed by an LCM controller. An operator can specify, via the link management user interface 1100, a node name 1102, an interface name 1104, or a threshold percent utilization 1106. The threshold percent utilization 1106 indicates at what utilization the link is considered congested, and thus subject to instantiation of one or more LCM polices to mitigate the congestion. The link management user interface 1100 also displays a list of interfaces 1108 being managed by an LCM controller.

Figure 12:
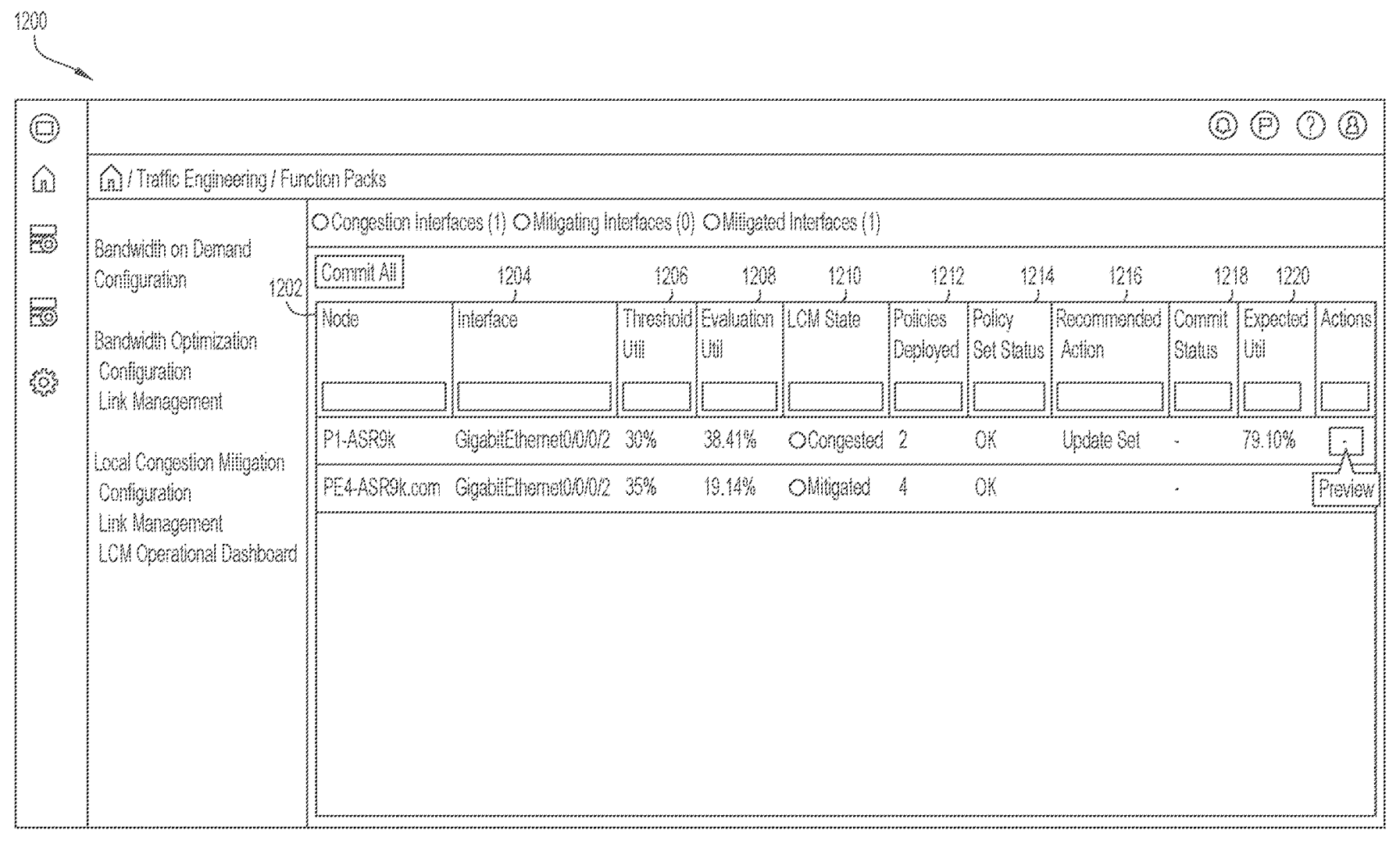

FIG. 12 illustrates an LCM operational dashboard 1200 in accordance with an example embodiment. The LCM operational dashboard 1200 provides current status on one or more interfaces managed by an LCM controller (e.g. each interface in the list of interfaces 1108 discussed above with respect to FIG. 11). The LCM operational dashboard 1200 displays a node name 1202, interface name 1204, threshold 1206, evaluated utilization 1208, LCM state 1210 (e.g. whether the link is congested, an LCM policy has been deployed to mitigate a congestion condition, or the link is nominal), an identification of which LCM policies 1212 have been deployed, a status of a policy set 1214, any recommended actions 1216, a commitment status 1218, and an expected utilization 1220.

In some embodiments, LCM is configured to operate in a manual mode. In the manual mode, any changes to SR polices are subject to approval/commitment by an operator. In the manual mode, an LCM controller evaluates the network and when congestion is detected, the LCM controller determines a recommended TTE policy set to mitigate the congestion. These recommended actions are presented to the user in a user interface, for example, via a custom LCM Operational Dashboard (see FIG. 9). From this user interface, the operator can observe a table of interfaces currently congested as well as mitigated. If the LCM controller recommends TTE policies be created, updated or deleted, these recommended actions will be highlighted in the LCM operational dashboard 1200.

Figure 13:
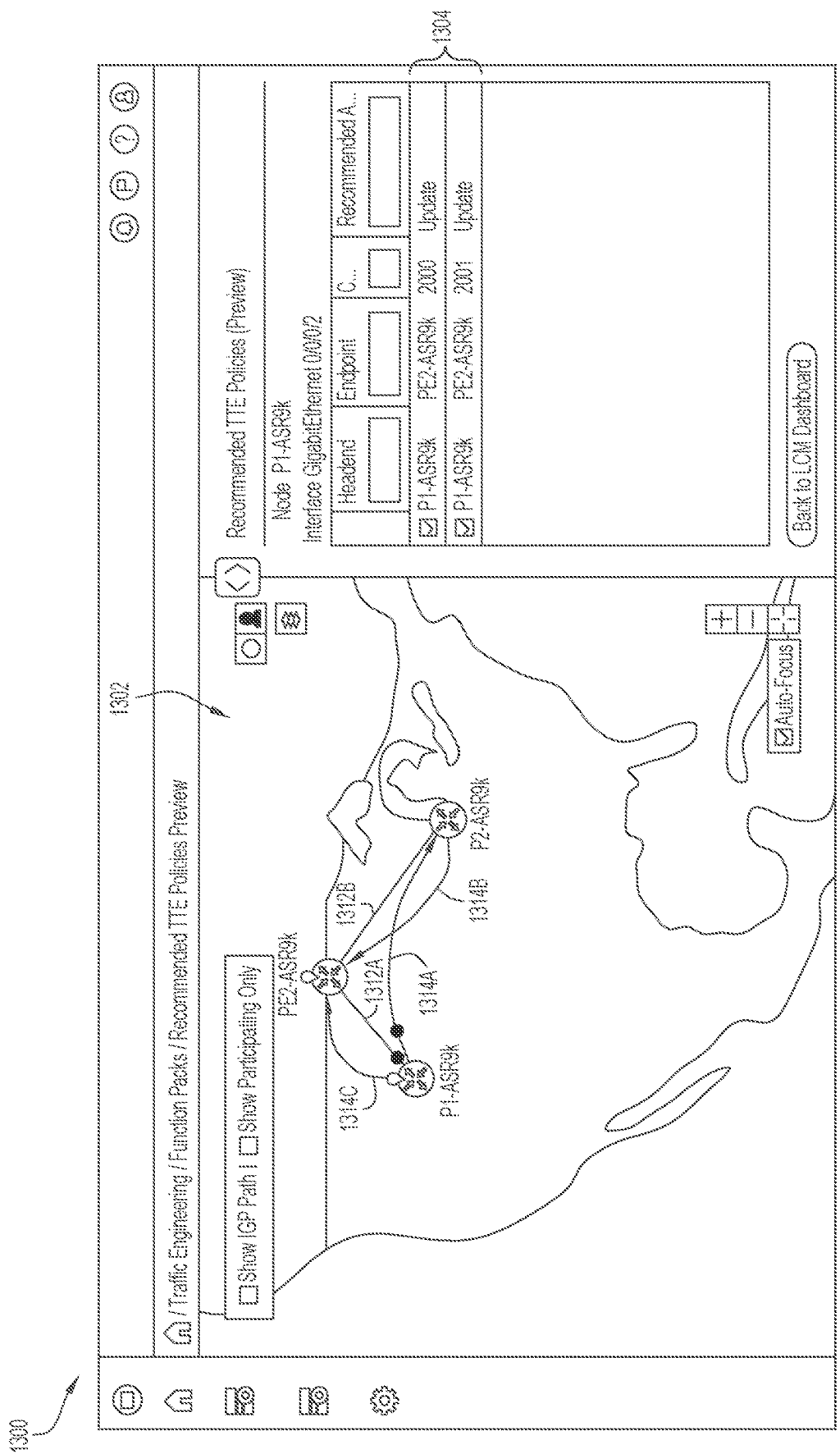
FIG. 13 illustrates a user interface for approving instantiation of one or more LCM policies according to an example embodiment.

FIG. 13 illustrates a user interface for approving instantiation of one or more LCM policies according to an example embodiment. The user interface 1300 includes a topology view 1302 and a list of recommended LCM policies 1304. The topology view 1302 includes a graphical depiction of how network traffic will be carried if the recommended LCM policies 1304 are instantiated. The topology view 1302 shows an existing routing between two intermediate network nodes, 1310A and 1310B. The existing route includes a first network segment 1312A and a second network segment 1312B. Instantiation of the recommended LCM policies 1304 will result in traffic flows according to arrow 1314A, arrow 1314B, and arrow 1314C.

Thus, via the user interface 1300, an operator can select to preview a change being recommended by LCM. This will cause display of a topology view 1302 that displays paths over which traffic is routed by the TTE policies. Once the operator is satisfied with the recommended changes, they can be committed to the network.

Figure 14:
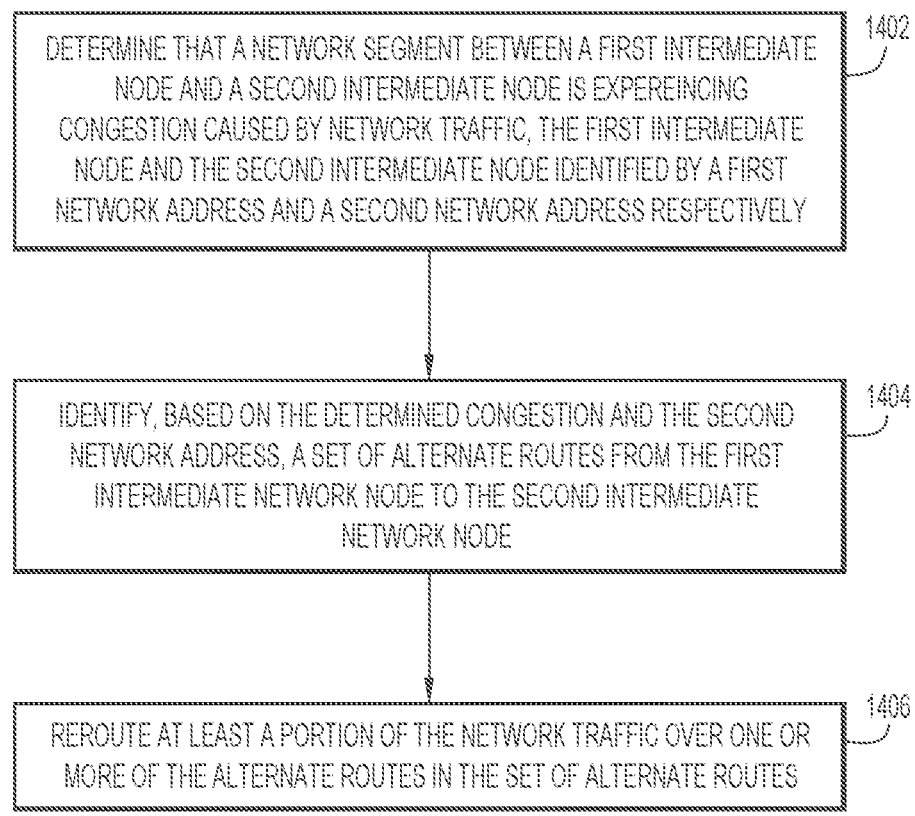
FIG. 14 is a flowchart of a method for mitigating a congested interface according to an example embodiment.

FIG. 14 is a flowchart of a method for mitigating a congested interface according to an example embodiment. In some embodiments, one or more of the functions discussed below with respect to FIG. 14 and method 1400 is performed by an LCM controller, such as any of the LCM controller 102 of FIG. 1A, the LCM controller 160 of FIG. 1B, or the LCM controller 602 of FIG. 6.

In operation 1402, a determination is made that a network segment between a first intermediate network node and a second intermediate network node is experiencing congestion. As discussed above, some embodiments receive one or more metrics that define traffic statistics or operational parameter values of one or more network nodes, such as routers, switches, or other components of a network. In some embodiments, these metrics are received by the TC 185 discussed above with respect to FIG. 1B. In some embodiments, the one or more metrics are evaluated by one or more criterion to determine whether the network segment is experiencing congestion. For example, as discussed above with respect to FIG. 11 and the threshold percent utilization 1106, some embodiments define a threshold percentage utilization of a link or interface, with utilization above the defined percentage as indicating the link or interface is congested.

The first intermediate network node is identified via a first network address, and the second intermediate network node is identified via a second network address. In some embodiments, one or more of the first intermediate network node or second intermediate network node is a router. The first and/or second network addresses are Internet Protocol (IP) addresses, at least in some embodiments.

In operation 1404, a set of alternate routes from the first intermediate network node to the second intermediate network node are identified. The set of alternate routes are identified based on the determined congestion state of the network segment. The set of alternate routes are also identified based on the first network address and the second network address. In some embodiments, the set of alternate routes are determined based on data defining a topology of the network. For example, as discussed above, some embodiments of an LCM controller utilize one or more of border gateway protocol-link state messages (BGP-LS), simple network management protocol (SNMP) messages, or path computation element protocol (PCEP) messages to develop a data set that defines the network topology. The set of alternate routes are then determined, at least in part, on the network topology.

Unlike conventional re-routing approaches which determine a route to an end destination of network traffic (e.g. an IP address specified in a destination address field of the network traffic), the disclosed embodiments search for alternate routes between two intermediate network nodes within a network. Thus, an end point address of the traffic is generally not considered when determining the alternate routes. Furthermore, identifying of the set of alternate routes generally inhibits consideration of a segment routed demand matrix (SRDM).

Once the alternative routes are identified and selected, one or more SR policies are defined that route traffic from a first endpoint of the congested network segment (e.g. the first intermediate node) over the selected alternative routes to a second endpoint of the congested network segment (e.g. the second intermediate node).

In some embodiments, the one or more SR polices are configured to also enable additional data collection at the first intermediate network node and/or the second intermediate network node. This additional data collection can improve the accuracy of a model used by the LCM controller to determine any congestion mitigation strategy in a subsequent iteration of method 1400. In some embodiments, the one-hop SR polices are configured to collect additional information, but do not necessarily change the routing of traffic. As discussed above, some embodiments inhibit re-routing of traffic until additional data has been collected to ensure an accuracy of an assessment of congestion of the network segment before any policies are deployed to change traffic routing. Other embodiments combine traffic re-routing with additional data collection, and then during a second iteration, adjust the re-routing as necessary based on improved accuracy of congestion assessment provided by the additional data.

In some embodiments, traffic carried by the congested network segment is prioritized for re-routing. For example, some embodiments prioritize traffic outside a SR policy for rerouting over other traffic already controlled by an SR policy. The traffic outside a SR policy is then considered "optimizable" and routed via one or more of the alternate routes to the second intermediate network node. In some embodiments, an amount of optimizable traffic is determined by first determining a total amount of traffic carried by the congested network segment, and subtracting from the total a second amount of traffic that is within one or more existing SR policies to obtain a difference between the total amount of traffic and that within an existing SR policy. This identifies a third amount of "optimizable" traffic carried by the network segment but outside an existing SR policy. This third amount is then used, in some embodiments, to determine a number of SR polices or alternative routes necessary to detour the third amount of traffic away from the congested network segment. In some embodiments, a number of SR policies generated by operation 1404 is based on an equal cost multipath (ECMP) split of an amount of traffic substantially equivalent to the difference.

Some embodiments determine a ratio between an existing utilization (or traffic demand) of the network segment and a nominal utilization of the network segment. The ratio is also used, in some embodiments, to determine a number of alternative routes necessary. A plurality of SR polices are then generated, in some embodiments, based on the third amount and/or the ratio.

The determined SR polices are configured to cause an intermediate node instantiating the policy to route traffic on the identified alternate routes. These alternate routes provide a path for the traffic around the congested network segment. Traffic is then assigned to each of the generated SR polices. In some embodiments, the SR polices are generated to minimize a total internal gateway protocol (IGP) metric while routing an amount of traffic substantially equivalent to the difference around the network segment.

As discussed above with respect to FIG. 13, some embodiments of method 1400 cause presentation of a user interface that displays the alternate routes, and allows an operator to approve use of the alternate routes to mitigate congestion over the network segment. Thus, some embodiments of method 1400 receive, from the user interface a selection indicating whether one or more of the alternate routes identified above are approved for use in mitigating congestion of the network segment. Those routes and SR polices implementing those routes are then conditionally processed by operation 1406 as discussed below based on their respective approval.

In operation 1406, at least a portion of network traffic carried by the network segment is rerouted over one more of the alternate routes included in the set of alternate routes. As discussed above, to reroute the traffic, one or more of the determined polices are instantiated on endpoints of the congested network segment. Thus, the determined polices are instantiated on the first intermediate network node and the second intermediate network node as appropriate to cause the network traffic to be rerouted over the selected alternate routes.

Some embodiments of method 1400 continue to monitor traffic conditions on the congested network segment and/or the selected alternate routes. Additional iterations of method 1400 are performed in some embodiments to make additional adjustments to how the traffic is routed around the congested network segment. In some embodiments, metrics are collected and compared to a removal threshold, such as the removal or second traffic threshold 504 discussed above with respect to FIG. 5. As discussed above, some embodiments implement a hold margin that defines a difference between an amount of traffic that causes LCM polices to be deployed to mitigated a congestion condition, and a second amount of traffic that causes the LCM polices to be removed or revoked, and network routing to be returned to a default or nominal configuration.

Figure 15:
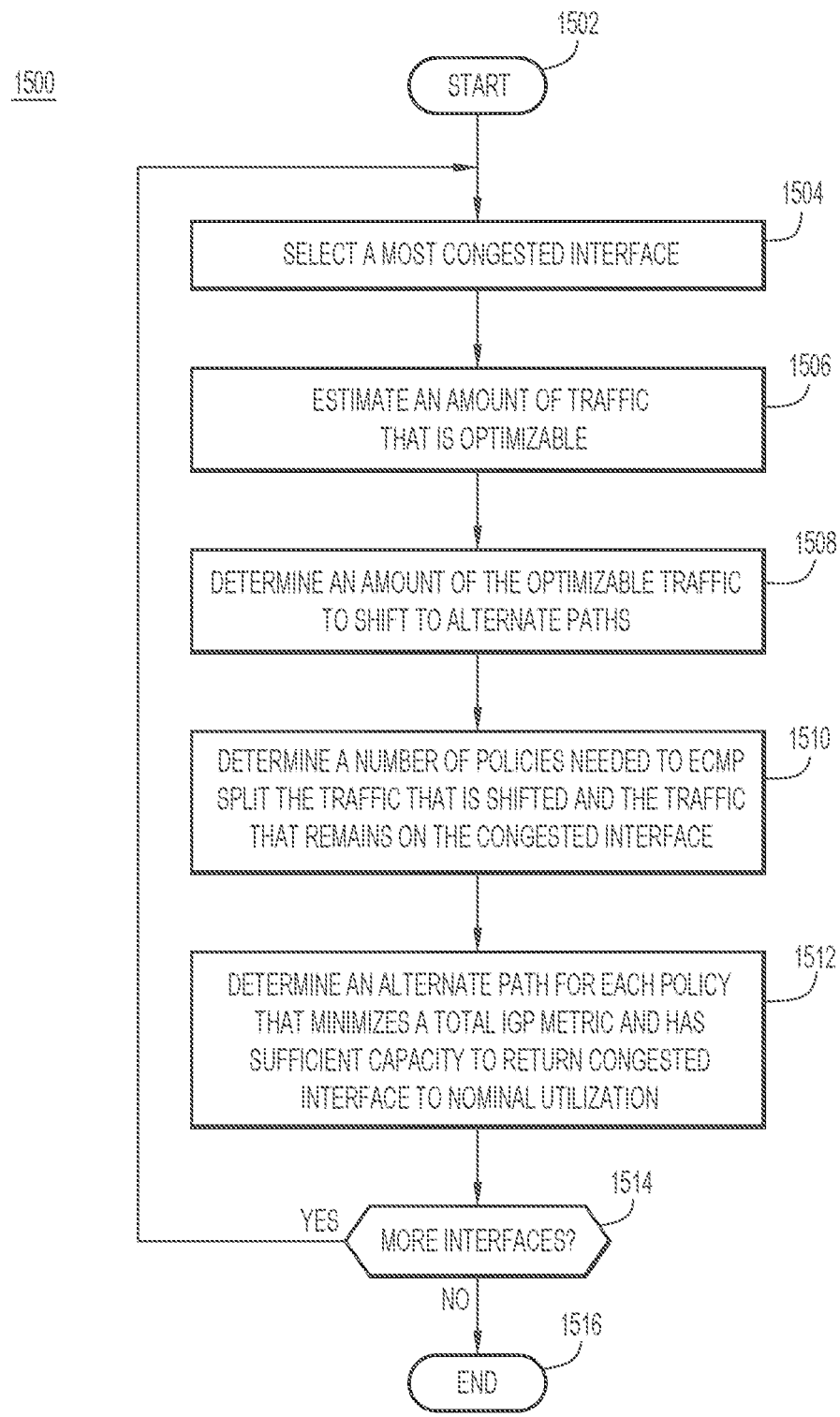
FIG. 15 is a flowchart of a method of determining alternative routes for traffic carried by a congested network segment.

FIG. 15 is a flowchart of a method of determining alternative routes for traffic carried by a congested network segment. In some embodiments, one or more of the functions discussed below with respect to method 1500 are performed by an LCM controller. Method 1500 describes a method that iterates through a list of interfaces, each of which has a varying amount of traffic and/or congestion. Each interface is evaluated to determine whether mitigation methods via LCM are warranted.

After start operation 1502, method 1500 moves to operation 1504, which selects a most congested interface from the list of interfaces. For example, as discussed above with respect to the link management user interface 1100, some embodiments maintain a list of interfaces managed by an LCM controller (e.g. the list of interfaces 1108). Thus, operation 1504 operates to evaluate a level of congestion of each interface or link in the list, to determine if any of the interfaces are over their congestion threshold (e.g. defined by a threshold analogous to the first traffic threshold 502 or the threshold percent utilization 1106 in some embodiments). An amount of congestion of each interface is determined, in some embodiments, by a percentage utilization that exceeds the percentage defining congestion of the respective interface. The percentage amounts are then compared to determine a most congested interface (e.g., a first interface with a traffic demand 5% over its congestion threshold is more congested than a second interface with a traffic demand 3% over its congestion threshold).

In operation 1506, an estimate of optimizable traffic over the selected interface is determined. As discussed above, in some embodiments, optimizable traffic is that traffic outside of any existing SR policies. In other embodiments, each SR policy has an associated priority, and SR polices having a priority below a predefined threshold, or a priority that is within a lower 50% of the SR policy priorities control optimizable traffic.

In operation 1508, an amount of the optimizable traffic to shift to alternate paths is determined. For example, in some embodiments, the amount of optimizable traffic to shift is represented by an amount of traffic that must be removed from the congested interface to return the congested interface to a nominal utilization. For example, in some embodiments, the nominal utilization is represented by the second traffic threshold 504 discussed above with respect to FIG. 5. In other embodiments, a nominal utilization is represented by an amount below the first traffic threshold 502 of FIG. 5.

In operation 1510, a number of polices necessary to control traffic over the congested interface is determined. The traffic over the congested interface is broadly categorized as two types. A first type of traffic remains carried by the congested interface. Thus, any SR polices deployed by method 1500 do not change a network path of this first type of traffic. An SR policy to control this traffic is still valuable however. For example, the SR policy can serve to collect additional metrics describing a more accurate representation of the amount of traffic being carried by the congested interface after deployment of the SR polices.

A second type of traffic is traffic that will travel an alternate route, instead of the congested interface, as a result of deployment of the SR polices. Thus, operation 1510 defines a set of SR polices that provide an ECMP split of the first type of traffic and the second type of traffic.

In operation 1512, an alternative network path for each policy is determined. The alternative path is determined to minimize total IGP metric, TE metric or delay while avoiding the congested link. The alternate path also has sufficient available capacity to return the congested interface to nominal utilization.

Decision operation 1514 evaluates whether additional interfaces need to be evaluated by method 1500 (e.g. any more interfaces in the list of interfaces 1108). When there are additional interfaces remaining to be evaluated, method 1500 returns to operation 1504, which then selects a next most congested interface. Otherwise, method 1500 moves from decision operation 1514 to end operation 1516.

Figure 16:
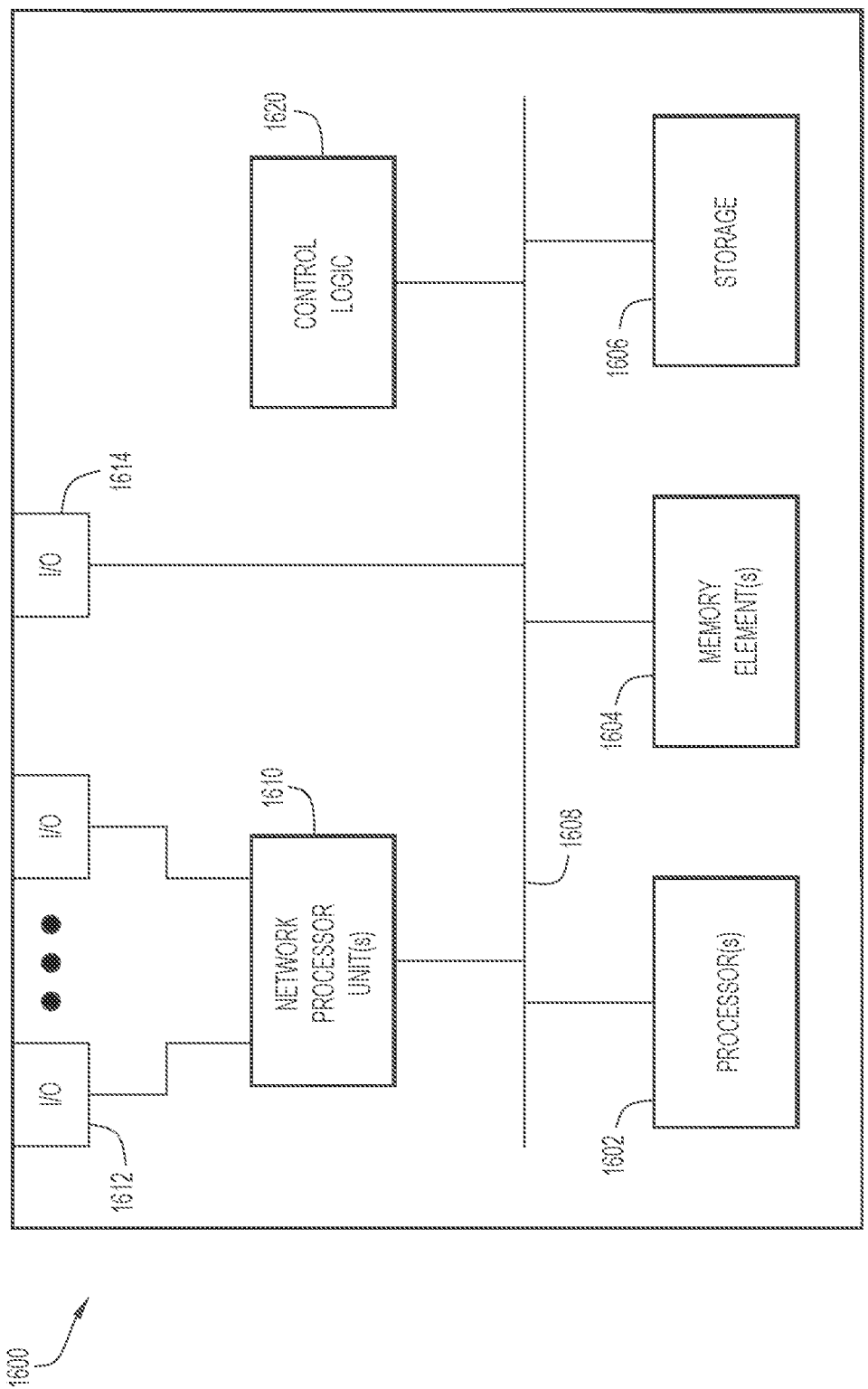
FIG. 16 is a diagram illustrating a computing device that may be configured to perform the operations presented herein, according to an example embodiment.

FIG. 16 is a hardware block diagram of a computing device 1600 that may perform functions associated with operations discussed herein in connection with the techniques depicted in FIGS. 1-15. In various embodiments, a computing device, such as computing device 1600 or any combination of one or more of the computing device 1600, are configured as any entity/entities as discussed for the techniques depicted in connection with FIGS. 1-15, such as the LCM controller, in order to perform operations of the various techniques discussed herein.

In at least one embodiment, the computing device 1600 may include one or more processor(s) 1602, one or more memory element(s) 1604, storage 1606, a bus 1608, one or more network processor unit(s) 1610 interconnected with one or more network input/output (I/O) interface(s) 1612, one or more I/O interface(s) 1614, and control logic 1620. In various embodiments, instructions associated with logic for computing device 1600 can overlap in any manner and are not limited to the specific allocation of instructions and/or operations described herein.

In at least one embodiment, processor(s) 1602 is/are at least one hardware processor configured to execute various tasks, operations and/or functions for computing device 1600 as described herein according to software and/or instructions configured for computing device 1600. Processor(s) 1602 (e.g., a hardware processor) can execute any type of instructions associated with data to achieve the operations detailed herein. In one example, processor(s) 1602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1604 and/or storage 1606 is/are configured to store data, information, software, and/or instructions associated with computing device 1600, and/or logic configured for memory element(s) 1604 and/or storage 1606. For example, any logic described herein (e.g., control logic 1620) can, in various embodiments, be stored for computing device 1600 using any combination of memory element(s) 1604 and/or storage 1606. Note that in some embodiments, storage 1606 can be consolidated with memory element(s) 1604 (or vice versa), or can overlap/exist in any other suitable manner.

In at least one embodiment, bus 1608 can be configured as an interface that enables one or more elements of computing device 1600 to communicate in order to exchange information and/or data. Bus 1608 can be implemented with any architecture designed for passing control, data and/or information between processors, memory elements/storage, peripheral devices, and/or any other hardware and/or software components that may be configured for computing device 1600. In at least one embodiment, bus 1608 may be implemented as a fast kernel-hosted interconnect, potentially using shared memory between processes (e.g., logic), which can enable efficient communication paths between the processes.

In various embodiments, network processor unit(s) 1610 may enable communication between computing device 1600 and other systems, entities, etc., via network I/O interface(s) 1612 (wired and/or wireless) to facilitate operations discussed for various embodiments described herein. In various embodiments, network processor unit(s) 1610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1600 and other systems, entities, etc. to facilitate operations for various embodiments described herein. In various embodiments, network I/O interface(s) 1612 can be configured as one or more Ethernet port(s), Fibre Channel ports, any other I/O port(s), and/or antenna(s)/antenna array(s) now known or hereafter developed. Thus, the network processor unit(s) 1610 and/or network I/O interface(s) 1612 may include suitable interfaces for receiving, transmitting, and/or otherwise communicating data and/or information in a network environment.

I/O interface(s) 1614 allow for input and output of data and/or information with other entities that may be connected to the computing device 1600. For example, I/O interface(s) 1614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1620 can include instructions that, when executed, cause processor(s) 1602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1604 and/or storage 1606 can store data, software, code, instructions (e.g., processor instructions), logic, parameters, combinations thereof, and/or the like used for operations described herein. This includes memory element(s) 1604 and/or storage 1606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that comprises determining that a network segment between a first intermediate network node and a second intermediate network node is experiencing congestion caused by network traffic, the first intermediate network node identified by a first network address and the second intermediate network node identified by a second network address, identifying, based on the determined congestion, and the second network address, a first set of alternate routes from the first intermediate network node to the second intermediate network node, and rerouting a first portion of the network traffic over one or more of the alternate routes in the set of alternate routes.

In another form, an apparatus is provided that comprises a network interface configured to enable network communications, one or more processors, and one or more memories storing instructions that when executed configure the one or more processors to perform operations comprising determining that a network segment between a first intermediate network node and a second intermediate network node is experiencing congestion caused by network traffic, the first intermediate network node identified by a first network address and the second intermediate network node identified by a second network address, identifying, based on the determined congestion, and the second network address, a first set of alternate routes from the first intermediate network node to the second intermediate network node, and rerouting a first portion of the network traffic over one or more of the alternate routes in the set of alternate routes.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   determining that a network path between a source network node and a destination network node includes a network segment between a first intermediate network node and a second intermediate network node;
   determining that the network segment between the first intermediate network node and the second intermediate network node is experiencing congestion caused by network traffic;
   implementing a multiple segment list Tactical Traffic Engineering policy at the first intermediate network node using Unequal Cost Multi-Path routing to split the network traffic between multiple segments between the first intermediate network node and the second intermediate network node, wherein implementing includes splitting the network traffic between the multiple segments between the first intermediate network node and the second intermediate network node using weights; and
   correcting for uneven equal cost multi-path splitting by adjusting the weights used for the Unequal Cost Multi-Path routing.

2. The method of claim 1, comprising:
   configuring a one-hop segment routing (SR) policy to collect traffic measurements between the first intermediate network node and the second intermediate network node;
   deploying the one-hop SR policy at the first intermediate network node;
   receiving the traffic measurements; and
   estimating an amount of traffic based on the traffic measurements,
   wherein implementing the multiple segment list Tactical Traffic Engineering policy is based on the amount of traffic.

3. The method of claim 1, further comprising determining a network topology based on one or more of border gateway protocol-link state messages (BGP-LS), simple network management protocol (SNMP) messages, or path computation element protocol (PCEP) messages, wherein implementing the multiple segment list Tactical Traffic Engineering policy is based on the network topology.

4. The method of claim 1, further comprising:
   determining a difference between a traffic demand of the network segment and a nominal utilization of the network segment; and
   determining the multiple segment list Tactical Traffic Engineering policy based on the difference.

5. The method of claim 1, wherein the second intermediate network node is a next hop for packets received at the first intermediate network node along the network path, wherein the first intermediate network node is identified by a first network address and the second intermediate network node is identified by a second network address.

6. The method of claim 5, wherein the network traffic comprises traffic provided from the source network node to the destination network node.

7. The method of claim 6, further comprising:
   identifying, based on the congestion, and the second network address and independent of network segments from the source network node to the first intermediate network node and network segments from the second intermediate network node to the destination network node, a first set of alternate routes from the first intermediate network node to the second intermediate network node; and
   rerouting a first portion of the network traffic over an alternate route in the first set of alternate routes.

8. An apparatus comprising:
   one or more network interfaces configured to enable network communications;
   one or more processors; and
   one or more memories storing instructions that when executed configure the one or more processors to perform operations comprising:
   determining that a network path between a source network node and a destination network node includes a network segment between a first intermediate network node and a second intermediate network node;
   determining that the network segment between the first intermediate network node and the second intermediate network node is experiencing congestion caused by network traffic;
   implementing a multiple segment list Tactical Traffic Engineering policy at the first intermediate network node using Unequal Cost Multi-Path routing to split the network traffic between multiple segments between the first intermediate network node and the second intermediate network node, wherein implementing includes splitting the network traffic between the multiple segments between the first intermediate network node and the second intermediate network node using weights; and
   correcting for uneven equal cost multi-path splitting by adjusting the weights used for the Unequal Cost Multi-Path routing.

9. The apparatus of claim 8, the operations further comprising:
   configuring a one-hop segment routing (SR) policy to collect traffic measurements between the first intermediate network node and the second intermediate network node;
   deploying the one-hop SR policy at the first intermediate network node;
   receiving the traffic measurements; and estimating an amount of traffic based on the traffic measurements, wherein implementing the multiple segment list Tactical Traffic Engineering policy is based on the amount of traffic.

10. The apparatus of claim 8, the operations further comprising determining a network topology based on one or more of border gateway protocol-link state messages (BGP-LS), simple network management protocol (SNMP) messages, or path computation element protocol (PCEP) messages, wherein implementing the multiple segment list Tactical Traffic Engineering policy is based on the network topology.

11. The apparatus of claim 8, the operations further comprising:
determining a difference between a traffic demand of the network segment and a nominal utilization of the network segment; and
determining the multiple segment list Tactical Traffic Engineering policy based on the difference.

12. The apparatus of claim 8, wherein the second intermediate network node is a next hop for packets received at the first intermediate network node along the network path, wherein the first intermediate network node is identified by a first network address and the second intermediate network node is identified by a second network address.

13. The apparatus of claim 12, wherein the network traffic comprises traffic provided from the source network node to the destination network node.

14. The apparatus of claim 13, the operations further comprising:
identifying, based on the congestion, and the second network address and independent of network segments from the source network node to the first intermediate network node and network segments from the second intermediate network node to the destination network node, a first set of alternate routes from the first intermediate network node to the second intermediate network node; and
rerouting a first portion of the network traffic over an alternate route in the first set of alternate routes.

15. One or more tangible non-transitory storage mediums comprising instructions that when executed configure one or more processors to perform operations comprising:
determining that a network path between a source network node and a destination network node includes a network segment between a first intermediate network node and a second intermediate network node;
determining that the network segment between the first intermediate network node and the second intermediate network node is experiencing congestion caused by network traffic;
implementing a multiple segment list Tactical Traffic Engineering policy at the first intermediate network node using Unequal Cost Multi-Path routing to split the network traffic between multiple segments between the first intermediate network node and the second intermediate network node, wherein implementing includes splitting the network traffic between the multiple segments between the first intermediate network node and the second intermediate network node using weights; and
correcting for uneven equal cost multi-path splitting by adjusting the weights used for the Unequal Cost Multi-Path routing.

16. The one or more tangible non-transitory storage mediums of claim 15, the operations further comprising:
configuring a one-hop segment routing (SR) policy to collect traffic measurements between the first intermediate network node and the second intermediate network node;
deploying the one-hop SR policy at the first intermediate network node;
receiving the traffic measurements; and
estimating an amount of traffic based on the traffic measurements,
wherein implementing the multiple segment list Tactical Traffic Engineering policy is based on the amount of traffic.

17. The one or more tangible non-transitory storage mediums of claim 15, the operations further comprising determining a network topology based on one or more of border gateway protocol-link state messages (BGP-LS), simple network management protocol (SNMP) messages, or path computation element protocol (PCEP) messages, wherein implementing the multiple segment list Tactical Traffic Engineering policy is based on the network topology.

18. The one or more tangible non-transitory storage mediums of claim 15, wherein the second intermediate network node is a next hop for packets received at the first intermediate network node along the network path, wherein the first intermediate network node is identified by a first network address and the second intermediate network node is identified by a second network address.

19. The one or more tangible non-transitory storage mediums of claim 18, wherein the network traffic comprises traffic provided from the source network node to the destination network node.

20. The one or more tangible non-transitory storage mediums of claim 19, the operations further comprising:
identifying, based on the congestion, and the second network address and independent of network segments from the source network node to the first intermediate network node and network segments from the second intermediate network node to the destination network node, a first set of alternate routes from the first intermediate network node to the second intermediate network node; and
rerouting a first portion of the network traffic over an alternate route in the first set of alternate routes.

* * * * *